(12) United States Patent
Liao et al.

(10) Patent No.: US 8,509,410 B2
(45) Date of Patent: Aug. 13, 2013

(54) METHOD, DEVICE AND SYSTEM FOR CALL ESTABLISHMENT

(75) Inventors: Shuzhao Liao, Shenzhen (CN); Yingbin Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/532,173

(22) Filed: Jun. 25, 2012

(65) Prior Publication Data

US 2012/0263286 A1 Oct. 18, 2012

Related U.S. Application Data

(63) Continuation of application No. PCT/CN2010/078585, filed on Nov. 10, 2010.

(30) Foreign Application Priority Data

Dec. 25, 2009 (CN) .......................... 2009 1 0265513

(51) Int. Cl.
*H04M 3/42* (2006.01)

(52) U.S. Cl.
USPC ....... 379/202.01; 370/261; 709/204; 709/227

(58) Field of Classification Search
USPC ................... 379/202.01; 370/261; 709/204, 709/227
See application file for complete search history.

(56) References Cited

U.S. PATENT DOCUMENTS 8,229,096 B1 * 7/2012 Marquis et al. .......... 379/202.01
2009/0164575 A1 6/2009 Barbeau et al.

FOREIGN PATENT DOCUMENTS

| CN | 1964308 A | | 5/2007 |
| CN | 101047534 A | | 10/2007 |
| CN | 101083752 A | | 12/2007 |
| CN | 101753329 A | | 6/2010 |
| JP | 2005006294 A | | 1/2005 |
| JP | 2007228429 A | | 9/2007 |
| JP | 2020034902 | * | 7/2008 |
| JP | 2009141812 A | | 6/2009 |

OTHER PUBLICATIONS

International Search Report and Written Opinion of the International Searching Authority issued in corresponding PCT Patent Application No. PCT/CN2010/078585, mailed Feb. 24, 2011.
Extended European Search Report issued in corresponding European Patent Application No. 10838604.6, mailed Dec. 10, 2012.

\* cited by examiner

*Primary Examiner* — Quynh Nguyen
(74) *Attorney, Agent, or Firm* — Brinks Hofer Gilson & Lione

(57) ABSTRACT

The present invention, relating to the field of communications, discloses a method, device and system for call establishment, wherein the method includes: obtaining the pre-configured binding relationship between conference rooms and terminals; setting the correspondences between terminals of a calling conference room and terminals of a called conference room according to said binding relationship; and establishing media communication with the terminals provided with the correspondences. Embodiments of the present invention also provide a call establishment device and a call establishment system. Embodiments of the present invention overcome various limits and defects due to the fact that calls between other corresponding terminals can only be established via a particular terminal in each conference room in the prior art, and enable a code stream to be transmitted in the shortest path, thereby greatly reducing the path delay and improving the video conference system scalability.

12 Claims, 11 Drawing Sheets

METHOD, DEVICE AND SYSTEM FOR CALL ESTABLISHMENT

CROSS-REFERENCE TO RELATED APPLICATIONS

This application is a continuation of International Application No. PCT/CN2010/078585, filed on Nov. 10, 2010, which claims priority to Chinese Patent Application No. 200910265513.4, entitled "Method, Device and System for Call Establishment", filed on Dec. 25, 2009, both of which are hereby incorporated by reference in their entireties.

FIELD OF THE INVENTION

The present invention relates to the field of communications, and particularly, to a method, a device and a system for call establishment.

BACKGROUND OF THE INVENTION

As a way for performing remote communications between two or more parties, the video conference is used more and more widely due to its advantages such as saving the manpower and material cost and improving the efficiency. Generally, during a video conference, the video and audio sources collected on the local side are encoded and then the encoded data is transmitted to an opposite side for performing decoding, so thon the opposite side can observe the conditions of the local side in real time. In order to enhance the user's sense of immediacy, a plurality of terminals are arranged at certain positions in the same conference room, and the multi-channel data collected at different angles in the conference room is transmitted to the opposite side, so that the opposite side can observe the conditions of the local side from multiple angles. Thus, the positional relationships between respective terminals on the local side need to be correctly recovered after decoding by the opposite side.

In the prior art, for the purpose of correctly recovering the positional relationships between respective terminals on the local side, generally one terminal in the conference room is taken as a call terminal for call establishment with other conference room, while other terminals in the conference room only exchange media streams with the terminal. Assuming that conference room Ta includes terminals Ta1, Ta2 and Ta3, and conference room Tb includes terminals Tb1, Tb2 and Tb3, while terminal Ta2 in conference room Ta and terminal Tb2 in conference room Tb serve as call terminals of the two conference rooms, respectively. Then when a video conference is carried out between conference rooms Ta and Tb, terminals Ta1 and Ta3 need to transmit the media stream to terminal Ta2, terminals Tb1 and Tb3 need to transmit the media stream to terminal Tb2, and a call is established between the two conference rooms via Ta2-Tb2.

The inventors find that the prior art at least has the following problems: only via a call terminal (i.e., Ta2 or Tb2) can a terminal (Ta1) in one conference room transmit the media stream to corresponding terminal (Tb1) in other conference room, which leads to a large path delay. In addition, the structure between the call terminal (Ta2) and the terminal (Ta1 or Ta3) is a server/client, which requires a strong processing capability of the call terminal. Moreover, the connections between respective terminals need to be established in a private manner, which is adverse to implement extensions, and the scalability will be worse in case the terminals in the conference room are increased.

SUMMARY OF THE INVENTION

The embodiments of the present invention provide a method, a device and a system for call establishment, to implement the establishment of binding relationship between respective terminals in the conference room, and establish a call between corresponding terminals based on the binding relationship, so that the code stream is transmitted in a shortest path, thereby greatly reducing the path delay and improving the expandability of the video conference system.

The embodiments of the present invention provide a method for call establishment, comprising:

obtaining a pre-configured binding relationship between conference rooms and terminals;

setting correspondences between terminals of calling and called conference rooms according to the binding relationship; and establishing media communications with the terminals having the correspondences.

The embodiments of the present invention provide another method for call establishment, comprising:

Obtaining a pre-configured binding relationship between conference rooms and terminals, and setting correspondences between terminals of the conference rooms according to the binding relationship; and establishing media communications between a Multiple Control Unit (MCU) and the terminals according to the binding relationship and the correspondences.

The embodiments of the present invention provide a device for call establishment, comprising:

a first obtaining module configured to obtain a pre-configured binding relationship between conference rooms and terminals;

a first setting module configured to set correspondences between the terminals of calling and called conference rooms according to the binding relationship; and a first call establishing module configured to establish media communication with a corresponding terminal The embodiments of the present invention provide another device for call establishment, comprising:

a second obtaining module configured to obtain a pre-configured binding relationship between conference rooms and terminals, and obtain correspondences between the terminals of the conference rooms according to the binding relationship; and a second call establishing module configured to establish media communications between the MCU and the terminals according to the binding relationship and the correspondences.

The embodiments of the present invention provide a system for call establishment, comprising the above device for call establishment and a register server.

The method, device and system for call establishment in the embodiments of the present invention obtain the pre-configured binding relationship between the conference room number and the terminal numbers of the same conference room, set the correspondences between the terminals of different conference rooms according to the binding relationship, and establish the calls between the call entities having the correspondences according to the binding relationship. The embodiments overcome various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability.

BRIEF DESCRIPTION OF THE DRAWINGS

The drawings described herein are used to provide a further understanding of the present invention, and they construct a part of this application rather than limitations to the present invention. In which.

DETAILED DESCRIPTION OF THE EMBODIMENTS

In order to make the objects, technical solutions and advantages of the present invention be clearer, the present invention is further detailedly described as follows with reference to the embodiments and the drawings. Herein the exemplary embodiments of the present invention and their descriptions are used to explain the present invention rather than limiting the present invention.

Figure 1:
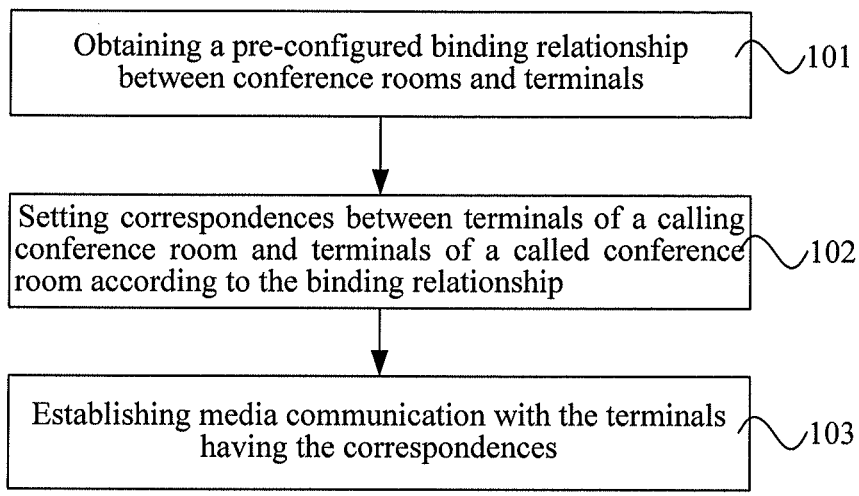
FIG. 1 is a flow diagram of Embodiment 1 of a method for call establishment in the present invention.

FIG. 1 is a flow diagram of Embodiment 1 of a method for call establishment in the present invention. As illustrated in FIG. 1, this embodiment provides a method for call establishment, and the network herein specifically includes a register server. The method may include:

Step 101: obtaining a pre-configured binding relationship between conference rooms and terminals;

Step 102: setting correspondences between terminals of a calling conference room and terminals of a called conference room according to the binding relationship;

Step 103: establishing media communication with the terminals having the correspondences. In which, the terminals in this embodiment may be those having or not having the capability of call signaling.

In which, uniform number encoding rules are provided in the video conference system, such as "country code+region code+number". In a fixed region such as a province, each terminal corresponds to a unique terminal number, and other terminals may establish a call with such terminal by calling the terminal number. Similarly, each conference room also corresponds to a unique conference room number, through which a call with corresponding conference room can be established.

This embodiment provides a method for call establishment, which obtains the pre-configured binding relationship between the conference room number and the terminal numbers of the same conference room, sets the correspondences between the terminals of different conference rooms according to the binding relationship, and establishes the media communications between terminals having the correspondences according to the binding relationship. This embodiment overcomes various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability.

Figure 2:
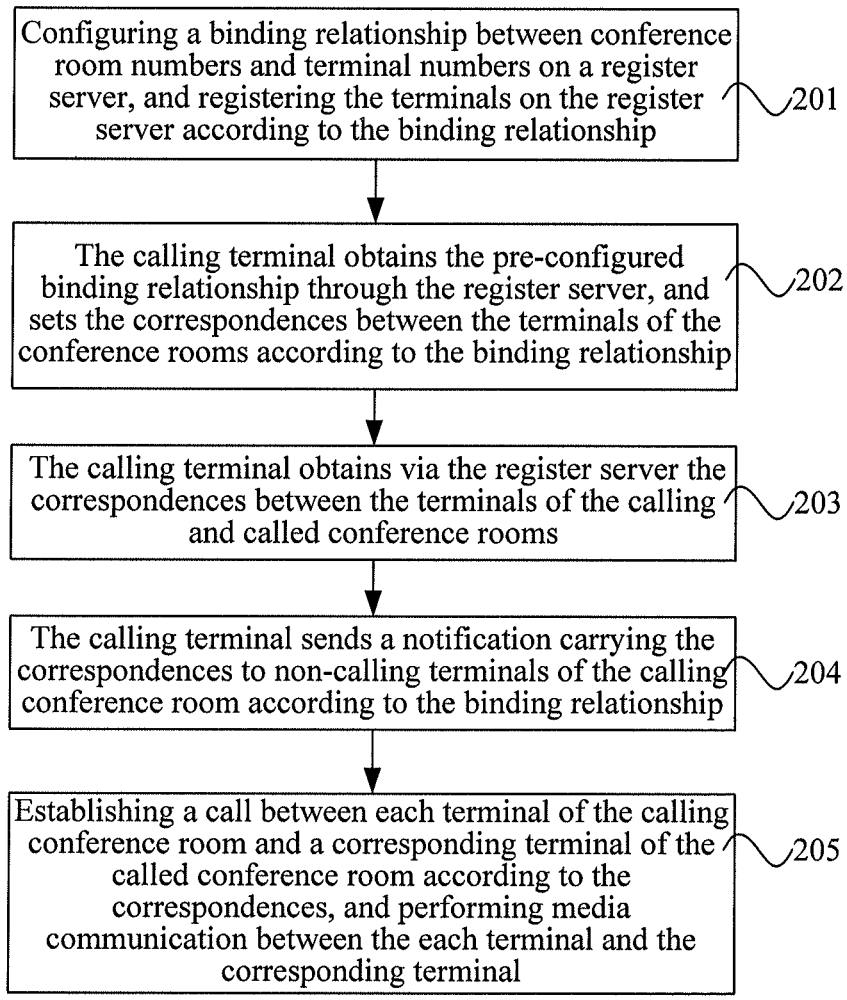
FIG. 2 is a flow diagram of Embodiment 2 of a method for call establishment in the present invention.

FIG. 2 is a flow diagram of Embodiment 2 of a method for call establishment in the present invention. As illustrated in FIG. 2, this embodiment provides a method for call establishment and it is a concretization of the above Embodiment 1. The calls established in this embodiment are those between the terminals of respective conference rooms in the video conference system. Specifically, this embodiment may include:

Step 201: configuring a binding relationship between conference room numbers and terminal numbers on a register server, and registering the terminals on the register server according to the binding relationship.

In this embodiment, the binding relationship between conference room numbers of each conference room in the video conference system and terminal numbers of the terminals in the conference room is firstly configured. Specifically, the terminal numbers of respective terminals in the same conference room are bound to the conference room number of the conference room, thus it can be acquired at the network side that a group of numbers bound together correspond to one conference room. Other conference rooms can establish a multi-channel call having the binding relationship with the terminals of that conference room by calling the conference room number or calling any terminal number in the conference room. To be noted, each terminal in the conference room can also serve as an ordinary terminal to establish a single-channel call. That is, when the called number is the conference room number, a multi-channel call having the binding relationship will be established with the terminals in the conference room, and when the called number is the terminal number, an ordinary single call will be established with the terminal represented by the terminal number. In this step, the binding relationship between the numbers is configured on a register server. In this embodiment, the register server may be a Gate Keeper (GK) in the H323 protocol, or a Session Initial Protocol (SIP) register server in the SIP, and herein the GK in the H323 protocol is taken as an example. Any terminal in the conference room can be directly registered on the register server, and the number registered by the terminal on the register server is the terminal number thereof. In this embodiment, the terminal can be registered according to the binding relationship between the numbers. Specifically, since the terminal numbers of respective terminals in a conference room have been bound to the conference room number of the conference room, during the registration, the register server deems that the conference room number of the conference room is registered online, once any terminal in the conference room has been registered online. There are many ways for implementing the registration, e.g., one terminal of the conference room may be firstly registered on the register server, and when the terminal sends a registration signaling to the register server, terminal numbers and address information of other terminals of the conference room may be carried in the registration signaling, thereby implementing the registrations of all the terminals of the conference room on the register server.

To be noted, in addition to directly configuring the binding relationship between the conference room number and the terminal numbers on the register server and directly registering the terminal on the register server as introduced in step 201, this embodiment may also configure the binding relationship and register the terminal as follows: configuring the terminal number of each terminal in the conference room; registering each terminal on a register server, and carrying the conference room number in a registration signaling of each terminal; and automatically establishing the binding relationship between the conference room number and the terminal numbers according to the registration signaling. In this solution, when each terminal sends a registration signaling to the register server, the terminal number of the terminal and the conference room number of the conference room where the terminal is located are carried in the registration signaling, i.e., both the terminal number and the conference room number are registered on the register server, so as to register each terminal on the register server. After the register server receives the registration signaling sent by each terminal of the conference room, the binding relationship between the conference room number and respective terminal numbers may be automatically established according to the terminal number and the conference room number carried in the registration signaling, without specially configuring the binding relationship between the conference room number and the terminal numbers.

Step 202: the calling terminal obtains the pre-configured binding relationship through the register server, and sets the correspondences between the terminals of the conference rooms according to the binding relationship, or the register server sets the correspondences between the terminals of the conference rooms according to the pre-configured binding relationship.

Since respective terminals of the conference room have been registered on the register server, and the register server is configured with the binding relationship between the terminal numbers of respective terminals in the same conference room and the conference room number, the register server can obtain the pre-configured binding relationship, and set the correspondences between the terminals of the conference room according to the binding relationship. The video conference system may have several conference rooms each arranged with a plurality of terminals, and the user's sense of immediacy may be enhanced by transmitting the media streams collected by several terminals in the conference room on the local side to other several terminals in the conference room on the opposite side. Since the terminals are placed at different positions, during the media stream transmission, the positional relationships need to be recovered by decoding the media stream by the conference room on the opposite side, i.e., certain correspondences need to be existed between the positions of respective terminals in the conference room on the local side and the positions of respective terminals in the conference room on the opposite side. In step 201, the conference room number of each conference room is bound with the terminal numbers of the terminals in the conference room, respectively, and this step sets the correspondences between the terminals of different conference rooms according to the binding relationship between numbers. It is assumed that there are two conference rooms A and B having conference room numbers Ta and Tb, respectively, conference room A includes three terminals having terminal numbers Ta1, Ta2 and Ta3, respectively, and conference room B includes three terminals having terminal numbers Tb1, Tb2 and Tb3, respectively. The correspondences between the terminals of the two conference rooms are set according to the pre-configured binding relationship between numbers Ta, Ta1, Ta2 and the number Ta3, and the binding relationship between numbers Tb, Tb1, Tb2 and the number Tb3, i.e., terminal Ta1 of conference room A is corresponding to terminal Tb1 of conference room B, terminal Ta2 of conference room A is corresponding to terminal Tb2 of conference room B, and terminal Ta3 of conference room A is corresponding to terminal Tb3 of conference room B. The terminals placed in the conference rooms shall meet the set correspondences. In which, when the terminal having the terminal number Ta1 is arranged at position 1 in conference room A, the terminal having the terminal number Tb1 is arranged at corresponding position 1 in conference room B; when the terminal having the terminal number Ta2 is arranged at position 2 in conference room A, the terminal having the terminal number Tb2 is arranged at corresponding position 2 in conference room B; and when the terminal having the terminal number Ta3 is arranged at position 3 in conference room A, the terminal having the terminal number Tb3 is arranged at corresponding position 3 in conference room B.

Step 203: the calling terminal obtains via the register server the correspondences between the terminals of the calling conference room and the terminals of the called conference room.

After the binding relationship between numbers and the correspondences between terminals of different conference rooms are configured, the calls between the terminals of the conference rooms can be established. Before a call is made, the correspondences between the terminals of the calling and called conference rooms are sent to the calling terminal through the register server. In this embodiment, explanations are made by taking terminal Ta1 of conference room A calling the terminal of conference room B as an example, i.e., the calling conference room is conference room A, the called conference room is conference room B, and the calling terminal is Ta1. When terminal Ta1 calls a terminal of conference room B, it firstly sends a call request to the register server to require establishing a call with the called number Tb. When it is determined that the called number Tb belongs to a number group having the binding relationship, the register server sends the correspondences between the terminals of conference rooms A and B to the calling terminal Ta1, the correspondences herein include the correspondence between terminal numbers Ta1 and Tb1 (Ta1-Tb1), the correspondence between terminal numbers Ta2 and Tb2 (Ta2-Tb2) and the correspondence between terminal numbers Ta3 and Tb3 (Ta3-Tb3).

Step 204: the calling terminal sends a notification carrying the correspondences to non-calling terminals of the calling conference room according to the binding relationship After obtaining the correspondences between the terminals of conference rooms A and B, the calling terminal Ta1 sends a notification to non-calling terminals of the calling conference room according to the pre-configured binding relationship, i.e., the binding relationship between terminal numbers Ta1, Ta2, Ta3 and Ta. Herein the non-calling terminals are terminals Ta2 and Ta3. That is, the calling terminal Ta1 sends a notification to terminals Ta2 and Ta3, rather than calling terminal Ta1, in the calling conference room A, respectively. The correspondence of Ta2 (i.e., Ta2-Tb2) is carried in the notification sent to terminal Ta2, and the correspondence of Ta3 (i.e., Ta3-Tb3) is carried in the notification sent to terminal Ta3.

Step 205: establishing a call between each terminal of the calling conference room and a corresponding terminal of the called conference room according to the correspondences, and performing media communication between each terminal and the corresponding terminal.

After respective terminals Ta1, Ta2 and Ta3 of the calling conference room A obtaining the correspondences between them and respective terminals of the called conference room B, the calls are established between terminals Ta, Ta2 and Ta3 of the calling conference room A and corresponding terminals Tb1, Tb2 and Tb3 of the called conference room B according to the correspondences, i.e., a call between terminals Ta1 and Tb1, a call between terminals Ta2 and Tb2 and a call between terminals Ta3 and Tb3 are established, respectively, thereby achieving the establishment of the multi-channel call having the binding relationship between the calling conference room A and the called conference room B. When the calls between the terminals having the correspondences are established, a media channel is established in the call link of each call, and a code stream is transmitted between each terminal and its corresponding terminal via the media channel to implement the media communication.

This embodiment provides a method for call establishment, which configures the binding relationship between the conference room number and the terminal numbers on the register server, registers the terminals on the register server according to the binding relationship and sets the correspondences between the terminals of different conference rooms according to the binding relationship. When a terminal of the calling conference room calls a terminal of the called conference room, the calling terminal obtains the pre-configured correspondences between the terminals of different conference rooms from the register server, and notifies the correspondences to other terminals of the calling conference room to establish the calls between the terminals having the correspondences. This embodiment overcomes various limitations and defects in the prior art caused by the fact that the call between other corresponding terminal can only be established via a particular terminal in each conference room, thus the code stream can be transmitted in the shortest path, thereby greatly reducing the path delay and improving the video conference system scalability.

Figure 3:
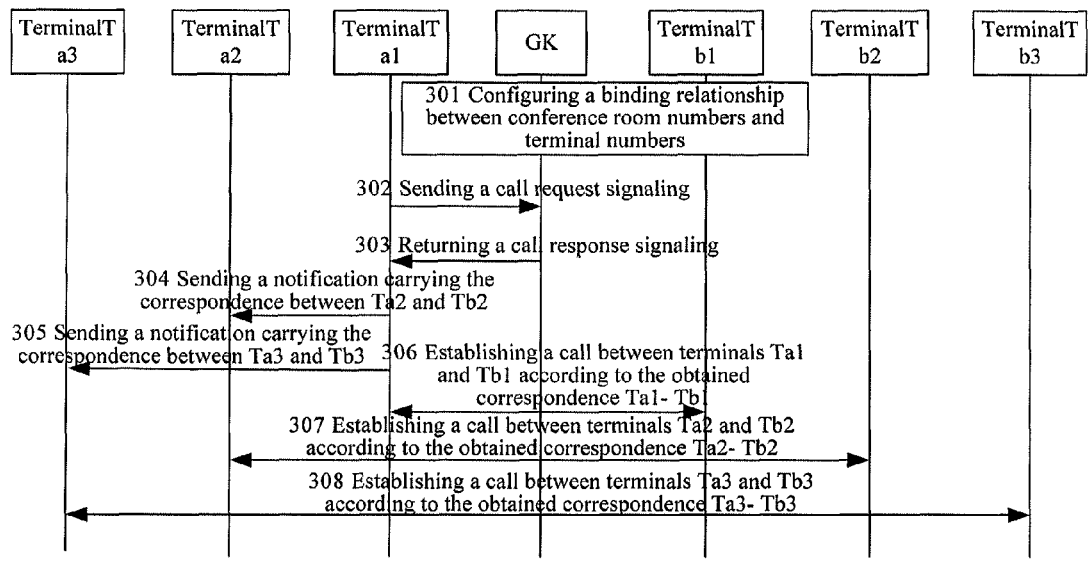
FIG. 3 is a signaling diagram of Embodiment 2 of a method for call establishment in the present invention.

FIG. 3 is a signaling diagram of Embodiment 2 of a method for call establishment in the present invention. As illustrated in FIG. 3, this embodiment makes further explanation to Embodiment 2 through a concrete signaling diagram. This embodiment still takes the example of two conference rooms A and B having conference room numbers Ta and Tb, respectively, wherein conference room A includes three terminals having terminal numbers Ta1, Ta2 and Ta3, respectively, and conference room B includes three terminals having terminal numbers Tb1, Tb2 and Tb3, respectively. Specifically, this embodiment may include:

Step 301: configuring a binding relationship between conference room numbers and terminal numbers on a GK, and registering respective terminals of the conference rooms on the GK.

Step 302: terminal Ta1 sends a call request signaling to the GK to require establishing a call with a called number Tb.

Step 303: after receiving the call request signaling, the GK returns a call response signaling to terminal Ta1 initiating the call, when it is determined that the called number Tb belongs to a number group having the binding relationship, and carries the correspondences between terminal numbers Ta, Ta2, Ta3 and terminal numbers Tb, Tb2, Tb3 in the call response signaling.

Step 304: after receiving the call response signaling, terminal Ta1 sends a notification carrying the correspondence between Ta2 and Tb2, to terminal Ta2 having the binding relationship with Ta1.

Step 305: sending a notification carrying the correspondence between Ta3 and Tb3, to terminal Ta3 having the binding relationship with Ta1.

Step 306: establishing a call between terminals Ta1 and Tb1 according to the obtained correspondence Ta1-Tb1, and transmitting a code stream between Ta1 and Tb1 in a media channel established between Ta1 and Tb1.

Step 307: establishing a call between terminals Ta2 and Tb2 according to the obtained correspondence Ta2-Tb2, and transmitting a code stream between Ta2 and Tb2 in a media channel established between Ta2 and Tb2.

Step 308: establishing a call between terminals Ta3 and Tb3 according to the obtained correspondence Ta3-Tb3, and transmitting a code stream between Ta3 and Tb3 in a media channel established between Ta3 and Tb3.

To be noted, there is no fixed timing relationship between steps 304 and 305. A person skilled in the art can be appreciated that the execution order of the two steps may be adjusted based on actual conditions, and are not limited to those illustrated in FIG. 3. Similarly, there is no fixed timing relationship between steps 306 to 308. A person skilled in the art can be appreciated that the execution order of the three steps may be adjusted based on actual conditions, and are not limited to those illustrated in FIG. 3.

Figure 4:
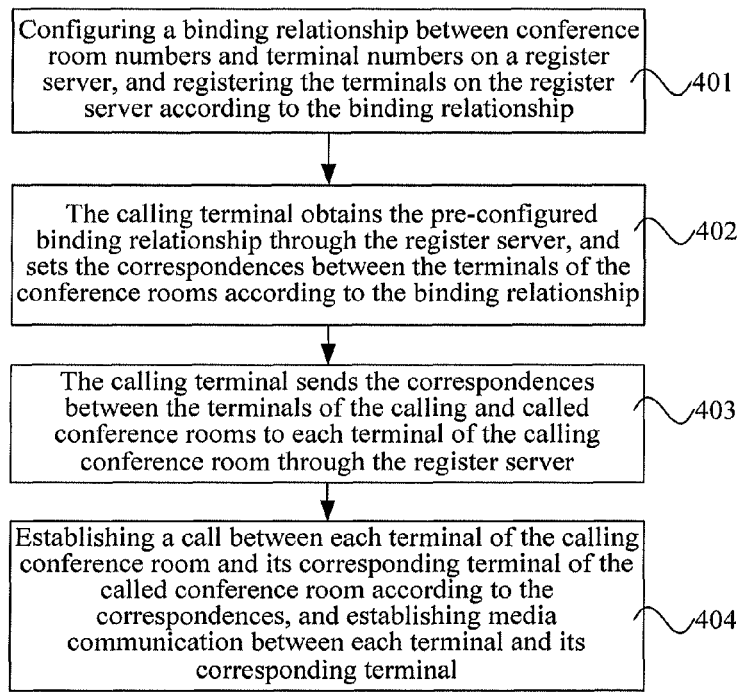
FIG. 4 is a flow diagram of Embodiment 3 of a method for call establishment in the present invention.

FIG. 4 is a flow diagram of Embodiment 3 of a method for call establishment in the present invention. As illustrated in FIG. 4, this embodiment provides a method for call establishment, and it is a concretization of Embodiment 1. The calls established in this embodiment are those between the terminals of respective conference rooms in the video conference system. Specifically, this embodiment may include:

Step 401: configuring a binding relationship between conference room numbers and terminal numbers on a register server, and registering the terminals on the register server according to the binding relationship. This step may be similar to step 201, and herein is omitted.

As a supplement to the specific way of configuring the binding relationship between conference room numbers and terminal numbers on the register server described in step 201, the following implementations may also be used to configure the binding relationship between conference room numbers and terminal numbers on the register server.

One optional implementation is to set a feature code for each conference room. The feature code is the common constituent part of terminal numbers of all the terminals of the conference room, i.e., the feature code is the same part in the terminal number of each terminal of the conference room. For example, the feature code of conference room 1 is *123*, wherein the terminal number of position 1 of conference room 1 is *123*001, the terminal number of position 2 thereof is *123*002, and the terminal number of position 3 thereof is *123*003; the feature code of conference room 2 is *456*, wherein the terminal number of position 1 of conference room 2 is 001*456*, the terminal number of position 2 thereof is 002*456*, and the terminal number of position 3 thereof is 003*456*. Of course, the terminal number of position 1 of conference room 2 may also be *456*001. Herein just an example rather than a limitation is described. The part of the terminal number where the feature code of the conference room is specifically located can be flexibly set, provided that the register server can accurately identify which terminals are located in the same conference room through the feature code.

Under the implementation, the terminal at position 1 of conference room 1 can call the terminal at position 1 of conference room 2 through the number 001*456*, or initiate a multi-channel call between conference rooms 1 and 2 by calling the feature code *456* of conference room 2. Under a scenario where the terminal at position 1 of conference room 1 initiates the multi-channel call between conference rooms 1 and 2 by calling the *456*, the terminal at position 1 of conference room 1 is the calling terminal, which sends a request carrying the feature code *456* of conference room 2 to the register server, and to which the register server returns the binding relationship between other terminals of conference room 1 and the terminals of conference room 2. The terminal at position 1 of conference room 1 issues the binding relationship to other corresponding terminals of conference room 1, and each terminal of conference room 1 sends a session establishment request to a terminal of conference room 2 having the binding relationship therewith to establish a session.

When reciting step 201, the latter embodiments may also substitute step 201 with the above optional solution.

Step 402: the calling terminal obtains the pre-configured binding relationship through the register server, and sets the correspondences between the terminals of the conference rooms according to the binding relationship, or the register server sets the correspondences between the terminals of the conference rooms according to the pre-configured binding relationship. This step may be similar to step 202, and herein is omitted. Of course, as a supplement to the implementation as described in step 202, this step may also be implemented in the following optional way.

When the register server detects that the terminal numbers of respective terminals registered thereon contain the feature code of the conference room, for example, three conference terminal numbers 0755*789*001, 0755*789*002 and 0755*789*003 are registered on the register server, the register server detects the existence of the feature code format, and acquires that a conference room having the feature code *789* is existed, and position 1, position 2 and position 3 of the terminals of the conference room are 001, 002 and 003 in sequence. Then the register server automatically establishes corresponding mapping relationships between position 1, position 2 and position 3 of the terminals of the conference room (e.g., conference room 3) and the three numbers, thereby completing the subsequent ordinary call or the multi-channel call between the conference rooms.

Under the scenario where the terminals of the conference room are registered on the register server in several formats, the following way may be used to implement a uniform configuration. For example, the register server configures the feature code of conference room 4 as *888*, predefines the terminal numbers of three positions of conference room 4 as *888*001, *888*002 and *888*003, respectively, and configures the three positions with unique IPs 1.1.1.1, 1.1.1.2 and 1.1.1.3, respectively, or unique aliases site4-1, site4-2 and site4-3, respectively. Regardless of the numbers of the terminals registered on the register server, the register server will automatically modify the registered numbers of the terminals as *888*001, *888*002 and *888*003. When any conference room or ordinary terminal calls the modified number such as *888*001, the register server automatically changes to call the terminal number at position 1 of conference room 4 before the modification. Similarly, the subsequent ordinary call or the multi-channel call between the conference rooms can be completed.

When reciting step 202, the latter embodiments may also substitute step 202 with the above optional solution.

Step 403: the calling terminal sends the correspondences between the terminals of the calling and called conference rooms to each terminal of the calling conference room through the register server.

After the binding relationship between the numbers and the correspondences between the terminals of different conference rooms are configured, the calls between the terminals of the conference rooms can be established. Before a call is made, the calling terminal sends a call request signaling to the register server to require establishing a call with the called conference room. After receiving the call request signaling, the register server simultaneously sends the correspondences between the terminals of the calling and called conference rooms to each terminal of the calling conference room, when it is determined that the conference room number of the called conference room belongs to a number group having the binding relationship. As the binding relationship between the numbers is stored in the register server, the register server may send the correspondences between the terminals to other terminal numbers bound with the calling terminal number according to the binding relationship. Each terminal of the calling conference room receives the signaling returned by the register server, and obtains the correspondences between the terminals of the calling and called conference rooms, i.e., obtains terminal number of the called conference room corresponding to itself.

Step 404: according to the correspondences, establishing the call between each terminal of the calling conference room and its corresponding terminal of the called conference room, and establishing the media communication between each terminal and its corresponding terminal.

After obtaining the correspondences between them and respective terminals of the called conference room, respective terminals of the calling conference room establish the calls between the terminals of the calling conference room and corresponding terminals of the called conference room according to the correspondences, thereby achieving the establishment of the multi-channel call having the binding relationship between the calling and the called conference rooms. When the calls between the terminals having the correspondences are established, a media channel is established in the call link of each call, and a code stream is transmitted between each terminal and its corresponding terminal via the media channel to implement the media communication.

This embodiment provides a method for call establishment, which configures the binding relationship between the conference room number and the terminal numbers on the register server, registers the terminals on the register server according to the binding relationship and sets the correspondences between the terminals of different conference rooms according to the binding relationship. When a terminal of the calling conference room calls a terminal of the called conference room, the register server sends the pre-configured correspondences between the terminals of different conference rooms to each terminal of the calling conference room, and establishes the calls between the terminals having the correspondences. This embodiment overcomes various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability.

Figure 5:
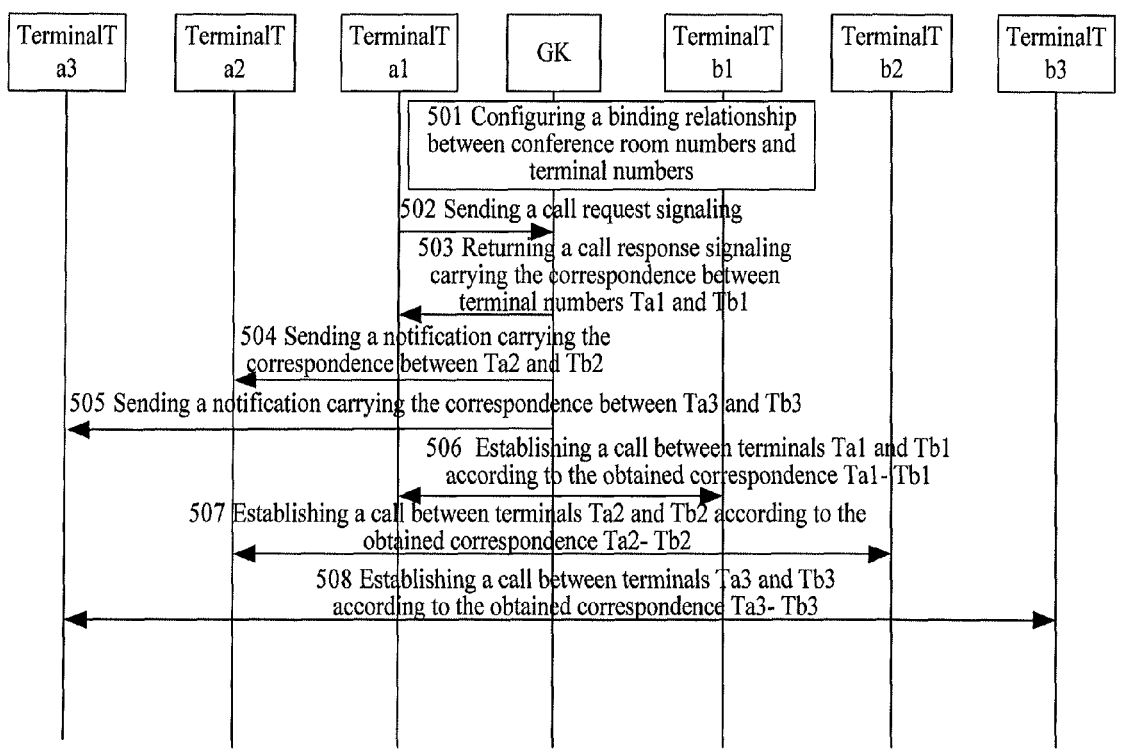
FIG. 5 is a signaling diagram of Embodiment 3 of a method for call establishment in the present invention.

FIG. 5 is a signaling diagram of Embodiment 3 of a method for call establishment in the present invention. As illustrated in FIG. 5, this embodiment makes further explanation to Embodiment 3 through a concrete signaling diagram. This embodiment still takes the example of two conference rooms A and B having conference room numbers Ta and Tb, respectively, wherein conference room A includes three terminals having terminal numbers Ta1, Ta2 and Ta3, respectively, and conference room B includes three terminals having terminal numbers Tb1, Tb2 and Tb3, respectively. Specifically, this embodiment may include:

Step 501: configuring a binding relationship between conference room numbers and terminal numbers on a GK, and registering respective terminals of the conference rooms on the GK.

Step 502: terminal Ta1 sends a call request signaling to the GK to require establishing a call with a called number Tb.

Step 503: after receiving the call request signaling, the GK returns a call response signaling to terminal Ta1, when it is determined that the called number Tb belongs to a number group having the binding relationship, and carries the correspondence between terminal numbers Ta1 and Tb1 in the call response signaling.

Step 504: the GK sends to terminal Ta2 a notification carrying the correspondence between terminal numbers Ta2 and Tb2.

Step 505: the GK sends to terminal Ta3 a notification carrying the correspondence between terminal numbers Ta3 and Tb3.

Step 506: establishing a call between terminals Ta1 and Tb1 according to the obtained correspondence Ta-Tb1, and transmitting a code stream between Ta1 and Tb1 in a media channel established between Ta1 and Tb1.

Step 507: establishing a call between terminals Ta2 and Tb2 according to the obtained correspondence Ta2-Tb2, and transmitting a code stream between Ta2 and Tb2 in a media channel established between Ta2 and Tb2.

Step 508: establishing a call between terminals Ta3 and Tb3 according to the obtained correspondence Ta3-Tb3, and transmitting a code stream between Ta3 and Tb3 in a media channel established between Ta3 and Tb3.

To be noted, there is no fixed timing relationship between steps 504 and 505. A person skilled in the art can be appreciated that the execution sequences of the two steps may be adjusted based on actual conditions, and are not limited to those illustrated in FIG. 5. Similarly, there is no fixed timing relationship between steps 506 to 508. A person skilled in the art can be appreciated that the execution sequences of the three steps may be adjusted based on actual conditions, and are not limited to those illustrated in FIG. 5.

Figure 6:
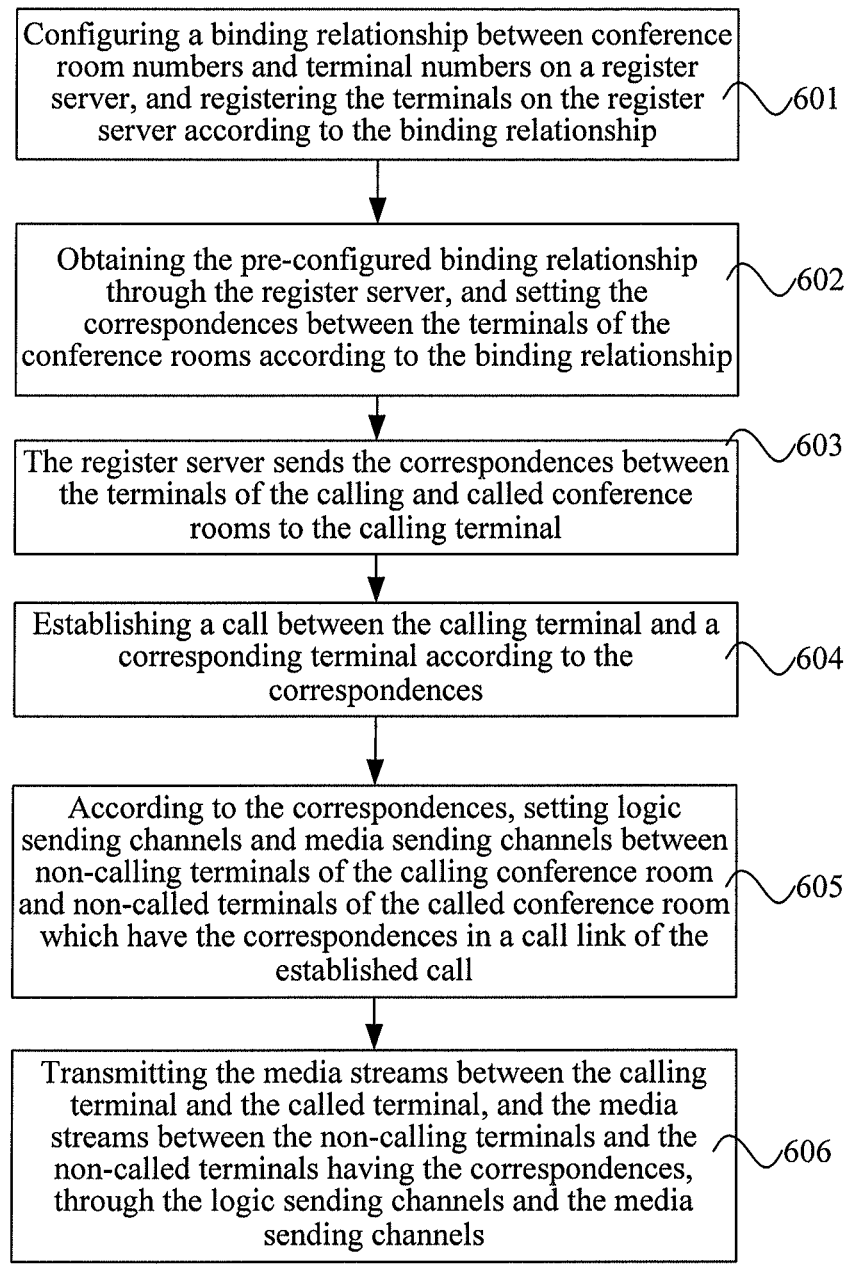
FIG. 6 is a flow diagram of Embodiment 4 of a method for call establishment in the present invention.

FIG. 6 is a flow diagram of Embodiment 4 of a method for call establishment in the present invention. As illustrated in FIG. 6, this embodiment provides a method for call establishment, and it is a concretization of Embodiment 1. The call entities in this embodiment include the terminals of the calling and called conference rooms, i.e., the calls established in this embodiment are those between the terminals of respective conference rooms in the video conference system. In this embodiment, the terminals of the conference room may include terminals having the call signaling capability and those not having the call signaling capability. For example, terminal Ta2 of conference room A may be a terminal having the call signaling capability, while other terminals Ta1 and Ta3 may be terminals not having the call signaling capability. Similarly, terminal Tb2 of conference room B may be a terminal having the call signaling capability, while other terminals Tb1 and Tb3 may be terminals not having the call signaling capability. Specifically, this embodiment may include:

Step 601: configuring a binding relationship between conference room numbers and terminal numbers on a register server, and registering the terminals on the register server according to the binding relationship. This step may be similar to step 201, and herein is omitted.

Step 602: the calling terminal obtains the pre-configured binding relationship through the register server, and sets the correspondences between the terminals of the conference rooms according to the binding relationship, or the register server sets the correspondences between the terminals of the conference rooms according to the pre-configured binding relationship. This step may be similar to step 202, and herein is omitted.

Step 603: the register server sends the correspondences between the terminals of the calling and called conference rooms to the calling terminal. This step may be similar to step 203, and herein is omitted.

Optionally, if in steps 601 and 602, the solutions as described in steps 401 and 402 are used to substitute implementation of steps 201 and 202, i.e., the terminal numbers at positions 1 to 3 of conference room 5 are registered on the register server as *020*001, *020*002 and *020*003, respectively, the terminal numbers at positions 1 to 3 of conference room 6 are registered on the register server as *66*001, *66*002 and *66*003, respectively, a positional correspondence between *020*001 and *66*001 is established, a positional correspondence between *020*002 and *66*002 is established, and a positional correspondence between *020*003 and *66*003 is established, as a substitute for the implementation as described in step 203, this step may also be implemented with the following optional solution.

In case the calling terminal *020*001 of conference room 5 calls terminal *66*001 at the corresponding position in conference room 6, a session can be established in the normal procedure.

In case the calling terminal *020*001 of conference room 5 calls a terminal such as *66*002 in conference room 6, which is not at the corresponding position, and when the register server inquires out that the terminal positionally corresponding to *020*001 should be *66*001, a conversion can be carried out in any of the following ways to call terminal *66*001 positionally corresponding to *020*001. The first way is to directly return the address of *66*001 to *020*001 during the resolution of the call IP address, so as to ensure the positional correspondence. The second way is that when *020*001 calls *66*002, the register server directly performs the signaling routing of the call and returns a call response signaling to *020*001 which establishes a call with the register server, then the register server initiates a call to *66*001 to complete the conversion. The third way is that when *020*001 calls *66*002, the register server refuses the call and returns to *020*001 the terminal number *66*001 having correspondence therewith, then *020*001 recalls *66*001. The fourth way is that when *020*001 calls

*66*002, the register terminal returns the correspondences between all the terminals of the two conference rooms to *020*001, which hangs up the current call, selects the terminal number *66*001 having correspondence therewith and reinitiates a call.

The calling terminal *020*001 of conference room 5 may also initiate a call to all the terminals of conference room 6 through calling a certain terminal of conference room 6. In that case, when *020*001 calls a terminal such as *66*002 of conference room 6, which is not at the corresponding position, and the register server inquires out that the terminal at the position corresponding to *020*001 should be *66*001, a conversion can be carried out in any of the following ways. The first way is to establish a call during the call process according to the object called by the calling terminal, rearranges respective terminals of the conference rooms according to the positional correspondences when the logic channel is opened, and opens the logic channel between terminals of the conference rooms having the positional correspondences. For example in fact *020*001 calls *66*002 and *020*002 calls *66*001. During the call establishment, the register server actually establishes a call between *020*001 and *66*002, and a call between *020*002 and *66*001. But when the logic channel is opened, the media transceiver port of *66*001 is transferred to *020*001, and the media transceiver port of *66*002 is transferred to *020*002. The second way is that when *020*001 calls *66*002, the register server returns the correspondences between all the terminals of the two conference rooms to *020*001, which hangs up the current call, selects the corresponding terminal number *66*001 and reinitiates a call. In addition, *020*001 sends, to other terminals of the conference room, terminal numbers of the terminals of conference room 6 which have positional correspondences with those other terminals, e.g., sends *66*002 to *020*002, so that *020*002 initiates a call directed to *66*002.

Step 604: establishing a call between the calling terminal and a corresponding terminal according to the correspondences.

This embodiment still takes the example of two conference rooms A and B having conference room numbers Ta and Tb, respectively, wherein conference room A includes three terminals having terminal numbers Ta1, Ta2 and Ta3, respectively, and conference room B includes three terminals having terminal numbers Tb1, Tb2 and Tb3, respectively. In which, terminals Ta2 and Tb2 are terminals having the call signaling capability, while other terminals Ta1, Ta3, Tb1 and Tb3 are terminals not having the call signaling capability. The calling terminal Ta2 sends a call request signaling to the register server to require establishing a call with the called conference room B. After receiving the call request signaling, the register server sends the correspondences (Ta1-Tb1, Ta2-Tb2, Ta3-Tb3) between the terminals to the calling terminal Ta2 through a call response signaling, when it is determined that the called number Tb belongs to a number group having the binding relationship. After the calling terminal Ta2 and its corresponding terminal Tb2 are obtained, a call between the calling terminal Ta2 and its corresponding terminal Tb2 is established according to the correspondence.

Step 605: according to the correspondences, setting logic sending channels and media sending channels between non-calling terminals of the calling conference room and non-called terminals of the called conference room which have the correspondences in a link of the established call.

In this embodiment, the non-calling terminals are terminals other than the calling terminal in the calling conference room where the calling terminal is located, and the non-called terminals are terminals other than the called terminal in the called conference room where the called terminal is located. After the call between the calling terminal Ta2 and its corresponding terminal Tb2 is established, according to the correspondences obtained from the register server, the logic sending channels and the media sending channels between the non-calling terminals of the calling conference room and the non-called terminals of the called conference room which have the correspondences (i.e., between the non-calling terminals and the non-called terminals of the calling conference room A and the called conference room B which have the correspondences), in the established call link Ta2→Tb2 between the calling terminal and its corresponding terminal. In this step, the non-calling terminals include terminals (Ta1 and Ta3) other than the calling terminal in the calling conference room, and the non-called terminals include terminals (Tb1 and Tb3) other than the called terminal in the called conference room. In this step, after the call between the calling terminal Ta2 and its corresponding terminal Tb2 is established, Ta2 opens three logic sending channels for media stream in the call link Ta2→Tb2 of the call, so as to simultaneously establish a media sending channel for media stream from Ta1 to Tb1, a media sending channel for media stream from Ta2 to Tb2, and a media sending channel for media stream from Ta3 to Tb3. Meanwhile, Tb2 opens three logic sending channels for media stream, so as to simultaneously establish a media sending channel for media stream from Tb1 to Ta1, a media sending channel for media stream from Tb2 to Ta2, and a media sending channel for media stream from Tb3 to Ta3.

Step 606: transmitting the media stream between the calling terminal and the called terminal, and the media streams between the non-calling terminals and the non-called terminals having the correspondences, through the logic sending channels and the media sending channels.

After the call between the calling terminal Ta2 and its corresponding terminal Tb2 is established, a logic sending channel and a media sending channel between each pair of corresponding terminals are set in the call link. Ta2 notifies, via signaling, Ta1 and Ta3 to start sending code streams, and meanwhile notifies, via signaling, Tb1 and Tb3 to receive the code streams sent by Ta1 and Ta3, respectively. Tb2 notifies, via signaling, Tb1 and Tb3 to start sending code streams, and notifies, via signaling, Ta1 and Ta3 to receive the code streams sent by Tb1 and Tb3, respectively. The code streams sent by Ta1, Ta2 and Ta3 are transmitted to Tb1, Tb2 and Tb3, respectively, via the established logic sending channels and media sending channels from Ta1 to Tb1, from Ta2 to Tb2 and from Ta3 to Tb3. Meanwhile, the code streams sent by Tb1, Tb2 and Tb3 are transmitted to Ta1, Ta2 and Ta3, respectively, via the established logic sending channels and media sending channels from Tb1 to Ta1, from Tb2 to Ta2 and from Tb3 to Ta3. Thus the media streams are transmitted between the non-calling terminals and the non-called terminals having the correspondences.

This embodiment provides a method for call establishment, which configures the binding relationship between the conference room number and the terminal numbers on the register server, registers the terminals on the register server according to the binding relationship and sets the correspondences between the terminals of different conference rooms according to the binding relationship. When a terminal of the calling conference room calls a terminal of the called conference room, the calling terminal obtains the pre-configured correspondences between the terminals of different conference rooms from the register server, establishes the call between the calling terminals and the corresponding terminals, sets logic sending channels and media sending channels between the terminals having the correspondences in the call link, respectively, and transmits the code streams between the terminals having the correspondences through the established media sending channels, respectively. This embodiment overcomes various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability. In addition, by establishing a call between a pair of corresponding terminals, this embodiment establishes a plurality of media sending channels, and transmits the code streams between multiple pairs of corresponding terminals, thereby saving the signaling overhead and improving the transmission efficiency.

Figure 7:
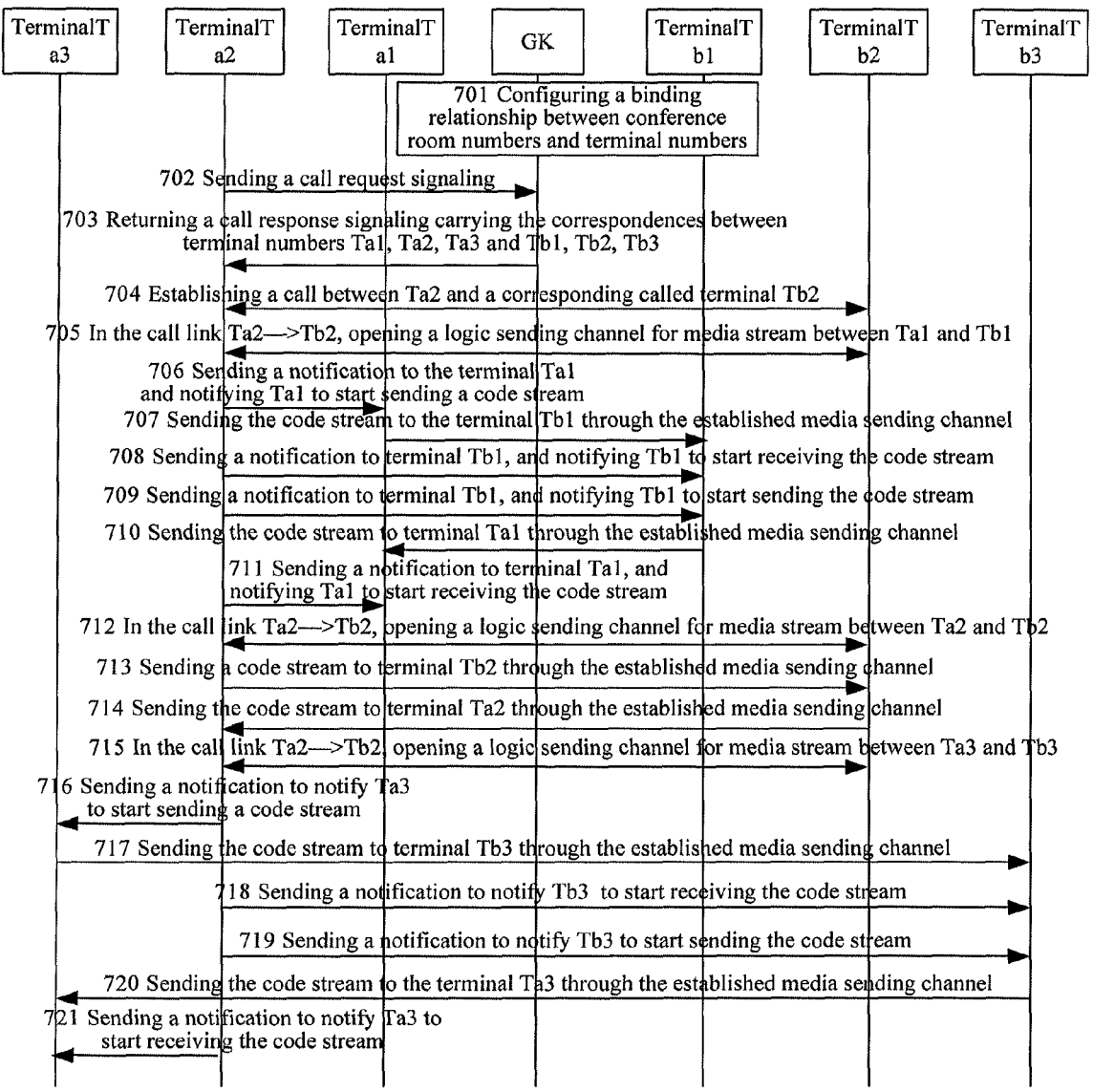
FIG. 7 is a signaling diagram of Embodiment 4 of a method for call establishment in the present invention.

FIG. 7 is a signaling diagram of Embodiment 4 of a method for call establishment in the present invention. As illustrated in FIG. 7, this embodiment makes further explanations to Embodiment 4 through a concrete signaling diagram. This embodiment still takes the example of two conference rooms A and B having conference room numbers Ta and Tb, respectively, wherein conference room A includes three terminals having terminal numbers Ta1, Ta2 and Ta3, respectively, and conference room B includes three terminals having terminal numbers Tb1, Tb2 and Tb3, respectively. Specifically, this embodiment may include:

Step 701: configuring a binding relationship between conference room numbers and terminal numbers on a GK, and registering respective terminals of the conference room on the GK.

Step 702: terminal Ta1 sends a call request signaling to the GK to require establishing a call with a called number Tb.

Step 703: after receiving the call request signaling, the GK returns a call response signaling to terminal Ta1 which initiates the call, when it is determined that the called number Tb belongs to a number group having the binding relationship, and carries the correspondences between terminal numbers Ta1, Ta2, Ta3 and Tb1, Tb2, Tb3 in the call response signaling.

Step 704: terminal Ta2 establishes a call with a corresponding called terminal Tb2.

Step 705: in the call link Ta2→Tb2, Ta2 opens a logic sending channel for media stream between Ta1 and Tb1, so as to establish a media sending channel for media stream between Ta1 and Tb1.

Step 706: terminal Ta2 sends a notification to terminal Ta1, and notifies Ta1 to start sending a code stream.

Step 707: terminal Ta1 sends the code stream to terminal Tb1 through the established media sending channel.

Step 708: terminal Ta2 sends a notification to terminal Tb1, and notifies Tb1 to start receiving the code stream.

Step 709: terminal Ta2 sends a notification to terminal Tb1, and notifies Tb1 to start sending the code stream.

Step 710: terminal Tb1 sends the code stream to terminal Ta1 through the established media sending channel.

Step 711: terminal Ta2 sends a notification to terminal Ta1, and notifies Ta1 to start receiving the code stream.

Step 712: in the call link Ta2→Tb2, Ta2 opens a logic sending channel for media stream between Ta2 and Tb2, so as to establish a media sending channel for media stream between Ta2 and Tb2.

Step 713: terminal Ta2 sends a code stream to terminal Tb2 through the established media sending channel.

Step 714: terminal Tb2 sends the code stream to terminal Ta2 through the established media sending channel.

Step 715: in the call link Ta2→Tb2, Ta2 opens a logic sending channel for media stream between Ta3 and Tb3, so as to establish a media sending channel for media stream between Ta3 and Tb3.

Step 716: terminal Ta2 sends a notification to terminal Ta3, and notifies Ta3 to start sending a code stream.

Step 717: terminal Ta3 sends the code stream to terminal Tb3 through the established media sending channel.

Step 718: terminal Ta2 sends a notification to terminal Tb3, and notifies Tb3 to start receiving the code stream.

Step 719: terminal Ta2 sends a notification to terminal Tb3, and notifies Tb3 to start sending the code stream.

Step 720: terminal Tb3 sends the code stream to terminal Ta3 through the established media sending channel.

Step 721: terminal Ta2 sends a notification to terminal Ta3, and notifies Ta3 to start receiving the code stream.

To be noted, there is no fixed timing relationship between steps 705-711, 712-714 and 715-721 in this embodiment. Steps 712-714 may be performed at first, then steps 705-711 are performed, and finally steps 715-721 are performed. A person skilled in the art will be appreciated that the technical solution of the present invention can also be implemented by performing the steps in other sequences. In addition, there is also no fixed timing relationship between steps 706-708 and 709-711. Steps 709-711 may be performed at first, and then steps 706-708 are performed. Similarly, there is also no fixed timing relationship between steps 713 and 714, and step 714 may be performed at first, then step 713 is performed. Further, there is no fixed timing relationship between steps 716-718 and steps 719-721.

Figure 8:
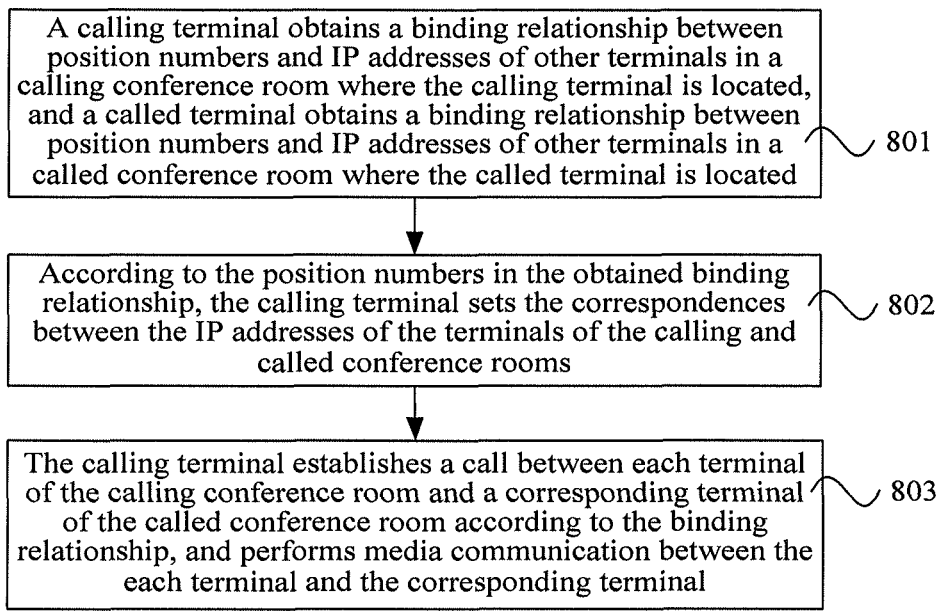
FIG. 8 is a flow diagram of Embodiment 5 of a method for call establishment in the present invention.

FIG. 8 is a flow diagram of Embodiment 5 of a method for call establishment in the present invention. As illustrated in FIG. 8, this embodiment provides a method for call establishment, and it is a concretization of Embodiment 1. In this embodiment, the network includes a plurality of conference rooms each having a plurality of terminals, while it may not include a register server. Specifically, this embodiment may include:

Step 801: a calling terminal obtains a binding relationship between position numbers and IP addresses of other terminals in a calling conference room where the calling terminal is located, and a called terminal obtains a binding relationship between position numbers and IP addresses of other terminals in a called conference room where the called terminal is located.

In this embodiment, the network has no register server, thus the calling terminal needs to obtain from each terminal, the pre-configured binding relationship between position numbers and IP addresses of other terminals in the conference room where the terminal is located. Specifically, the corresponding binding relationship may be obtained from the calling terminal and the called terminal between which a call is to be established. Specifically, the calling terminal obtains the binding relationship between position numbers and IP addresses of other terminals in the calling conference room where the calling terminal is located, and the called terminal obtains the binding relationship between position numbers and IP addresses of other terminals in the called conference room where the called terminal is located.

In this embodiment, before step 801, the method may include: configuring on each terminal, a binding relationship between position numbers and IP addresses of the terminal per se and other terminals of the conference room where the terminal is located. Since the network has no register server in this embodiment, the binding relationship needs to be configured on each terminal. In this embodiment, the binding relationship is those between the position numbers and the IP addresses of the terminals in the conference room. This step configures on each terminal, the binding relationship between position numbers and IP addresses of other terminals in the conference room where the terminal is located. For example, assuming that conference room Ta includes three terminals Ta1, Ta2 and Ta3, then terminal Ta1 needs to be configured with the binding relationship between the position number and the IP address of terminal Ta2, and the binding relationship between the position number and the IP address of terminal Ta3. Similarly, the binding relationship of Ta1 and the binding relationship of Ta3 are configured on Ta2. In which, the position number herein may indicate corresponding position of the terminal in the conference room. Each conference room includes a plurality of terminals, and different position numbers are employed to identify different positions of various terminals in the conference room.

Step 802: according to the position numbers in the obtained binding relationship, the calling terminal sets the correspondences between the IP addresses of the terminals of the calling and called conference rooms.

After the binding relationship of other terminals in the calling conference room and the binding relationship of other terminals in the called conference room are obtained from the calling terminal and the called terminal, respectively, the correspondences between the IP addresses of the terminals other than the calling terminal in the calling conference room and the IP addresses of the terminals other than the called terminal in the called conference room may be set according to the position numbers of respective terminals of the conference rooms in the obtained binding relationship. Since the binding relationship are those between the position numbers and the IP addresses of respective terminals, and the position numbers of the terminals in each conference room indicate the positions of the terminals in the conference room, the IP addresses of two terminals located at the same position in different conference rooms have correspondence, i.e., terminal Ta1 at position 1 in conference room Ta and terminal Tb1 at position 1 in conference room Tb have correspondence. It can be seen that the correspondences between the IP addresses of respective terminals of the calling and called conference rooms can be obtained based on the binding relationship of other terminals in the calling conference room obtained by the calling terminal and the binding relationship of other terminals in the called conference room.

Step 803: the calling terminal establishes a call between each terminal of the calling conference room and a corresponding terminal of the called conference room according to the binding relationship, and performs media communication between each terminal and the corresponding terminal.

After the binding relationship of respective terminals and the correspondences between the terminals of the conference rooms are obtained, the call between each terminal of the calling conference room and the corresponding terminal of the called conference room may be established according to the binding relationship. Specifically, the call to a terminal may be established by resolving the IP address of the terminal in the binding relationship and directly calling the IP address of the terminal. When the calls between the terminals having the correspondences are established, media channel will be established in the call link of each call, so as to transmit code stream between each terminal and the terminal corresponding thereto via the media channel, thereby implementing the media communication.

This embodiment provides a method for call establishment, wherein the calling terminal obtains the pre-configured binding relationship between the position numbers and the IP addresses of other terminals in the calling conference room, and the called terminal obtains the pre-configured binding relationship between the position numbers and the IP addresses of other terminals in the called conference room; the correspondences between the terminals of the conference rooms are further obtained according to the obtained binding relationship; and the media communications between the call entities which have the correspondences are established according to the binding relationship. This embodiment overcomes various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability.

Figure 9:
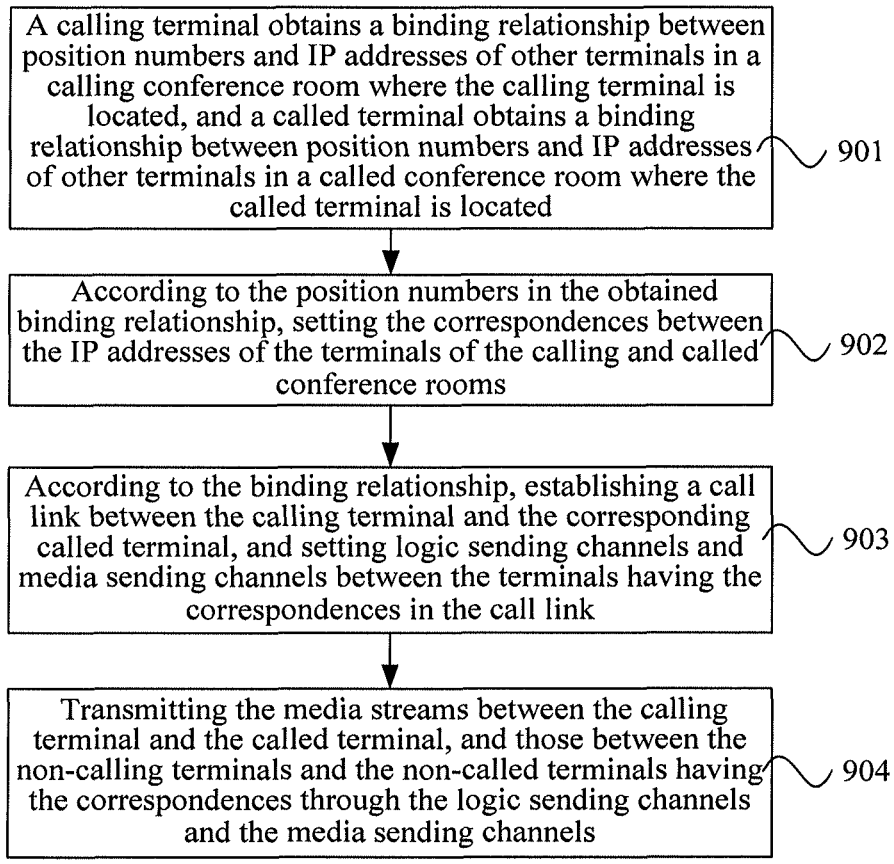
FIG. 9 is a flow diagram of Embodiment 6 of a method for call establishment in the present invention.

FIG. 9 is a flow diagram of Embodiment 6 of a method for call establishment in the present invention. As illustrated in FIG. 9, this embodiment provides a method for call establishment, and it is a concretization of Embodiment 1. In this embodiment, the network includes a plurality of conference rooms each having a plurality of terminals, while it may not include a register server. Specifically, this embodiment may include:

Step 901: a calling terminal obtains a binding relationship between position numbers and IP addresses of other terminals in a calling conference room where the calling terminal is located, and a called terminal obtains a binding relationship between position numbers and IP addresses of other terminals in a called conference room where the called terminal is located. This step may be similar to step 801, and herein is omitted.

Step 902: according to the position numbers in the obtained binding relationship, setting the correspondences between the IP addresses of the terminals of the calling and called conference rooms. This step may be similar to step 802 and herein is omitted.

Step 903: according to the binding relationship, establishing a call link between the calling terminal and the corresponding called terminal, and setting logic sending channels and media sending channels between the terminals having the correspondences in the call link.

After the binding relationship of respective terminals and the correspondences between the terminals of the conference rooms are obtained, the call between the calling terminal and the called terminal may be established firstly. The specific method for call establishment is the same as that described in the above embodiment, and herein is omitted. Next, the logic sending channel and the media sending channel between the calling terminal and the called terminal are set in the link of the established call between the calling terminal and the called terminal, and according to the obtained binding relationship, logic sending channels and media sending channels between non-calling terminals and non-called terminals having the correspondences are established. The specific process of channel establishment may be the same as that described in step 605. Herein the non-calling terminals may be the terminals other than the calling terminal in the calling conference room where the calling terminal is located, and the non-calling terminals may be the terminals other than the called terminal in the called conference room where the called terminal is located.

Step 904: transmitting media streams between respective terminals having the correspondences via the logic sending channels and the media sending channels. This step may be similar to step 606, and herein is omitted.

This embodiment provides a method for call establishment, wherein the calling terminal obtains the pre-configured binding relationship between the position numbers and the IP addresses of other terminals in the calling conference room, and the called terminal obtains the pre-configured binding relationship between the position numbers and the IP addresses of other terminals in the called conference room; according to the obtained binding relationship, the correspondences between the terminals of the conference rooms are further obtained; according to the binding relationship, the logic sending channels and the media sending channels between respective terminals having the correspondences are established in the call link between the calling terminal and the called terminal; and the code streams between respective terminals having the correspondences are transmitted through the established media sending channels. This embodiment overcomes various limitations and defects in the prior art caused by the fact that the call with other corresponding terminal can only be established via a particular terminal in each conference room, thus the code stream can be transmitted in the shortest path, thereby greatly reducing the path delay and improving the video conference system scalability. In addition, by establishing a call between a pair of corresponding terminals, this embodiment establishes a plurality of media sending channels, and transmits the code streams between multiple pairs of corresponding terminals, thereby saving the signaling overhead and improving the transmission efficiency.

Figure 10:
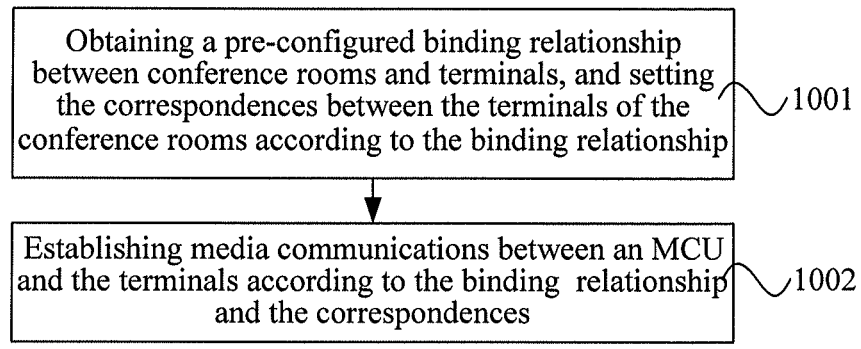
FIG. 10 is a flow diagram of Embodiment 7 of a method for call establishment in the present invention.

FIG. 10 is a flow diagram of Embodiment 7 of a method for call establishment in the present invention. As illustrated in FIG. 10, this embodiment provides another method for call establishment. The call entities in this embodiment include the terminals of the calling conference room and the Multiple Control Unit (MCU), i.e., the calls established in this embodiment are those between the terminals of respective conference rooms in the video conference system and the MCU. Specifically, this embodiment may include:

Step 1001: obtaining a binding relationship between conference rooms and terminals, and setting the correspondences between the terminals of the conference rooms according to the binding relationship.

Step 1002: establishing media communications between the MCU and the terminals according to the binding relationship and the correspondences.

This embodiment provides a method for call establishment, which obtains the pre-configured binding relationship between the conference room number and the terminal numbers of the same conference room, sets the correspondences between the terminals of different conference rooms according to the binding relationship, and establishes the media communications between the MCU and the terminals according to the binding relationship. This embodiment overcomes various limitations and defects in the prior art caused by the fact that the call with the MCU can only be established via a particular terminal in each conference room, thus the code stream can be transmitted in the shortest path, thereby greatly reducing the path delay and improving the video conference system scalability.

Figure 11:
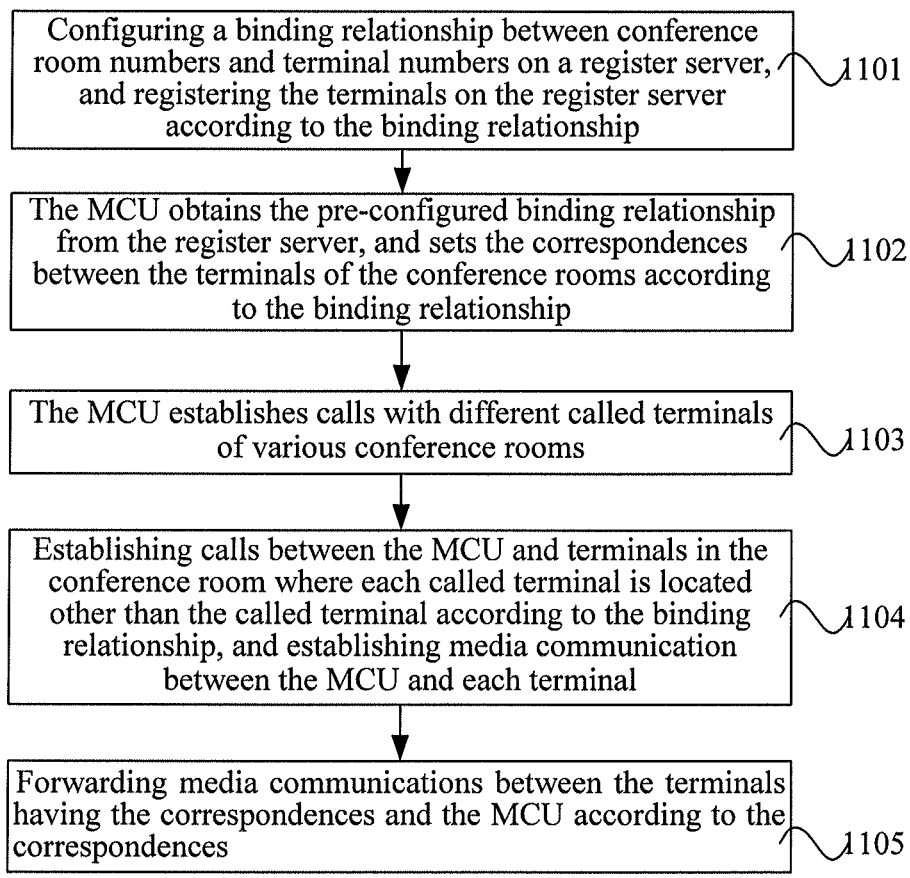
FIG. 11 is a flow diagram of Embodiment 8 of a method for call establishment in the present invention.

FIG. 11 is a flow diagram of Embodiment 8 of a method for call establishment in the present invention. As illustrated in FIG. 11, this embodiment provides a method for call establishment, and it is a concretization of Embodiment 7. Specifically, this embodiment may include:

Step 1101: configuring a binding relationship between conference room numbers and terminal numbers on a register server, and registering the terminals on the register server according to the binding relationship. This step may be similar to step 201, and herein is omitted.

Step 1102: the MCU obtains the pre-configured binding relationship from the register server, and sets the correspondences between the terminals of the conference rooms according to the binding relationship. This step may be similar to step 202, and herein is omitted.

Step 1103: the MCU establishes the calls with different called terminals of various conference rooms. This step calls different called terminals of various conference rooms through the MCU. Herein different called terminals have correspondences to establish the calls between the MCU and different called terminals of various conference rooms.

Step 1104: establishing calls with terminals other than each called terminal in the conference room where the called terminal is located according to the binding relationship, and establishing media communications with respective terminals.

Step 1105: forwarding media communications between the terminals having the correspondences and the MCU according to the correspondences. In each conference room, after the call between one terminal and the MCU is established, a call will be established between each terminal in the conference room and the MCU according to the binding relationship between the terminals of the same conference room pre-configured on the register server, so as to establish a media channel in the call link of each call, and forward the code stream between each terminal and its corresponding terminal by the MCU through the media channel, thereby implementing the media communication between the terminals having the correspondences.

Figure 12:
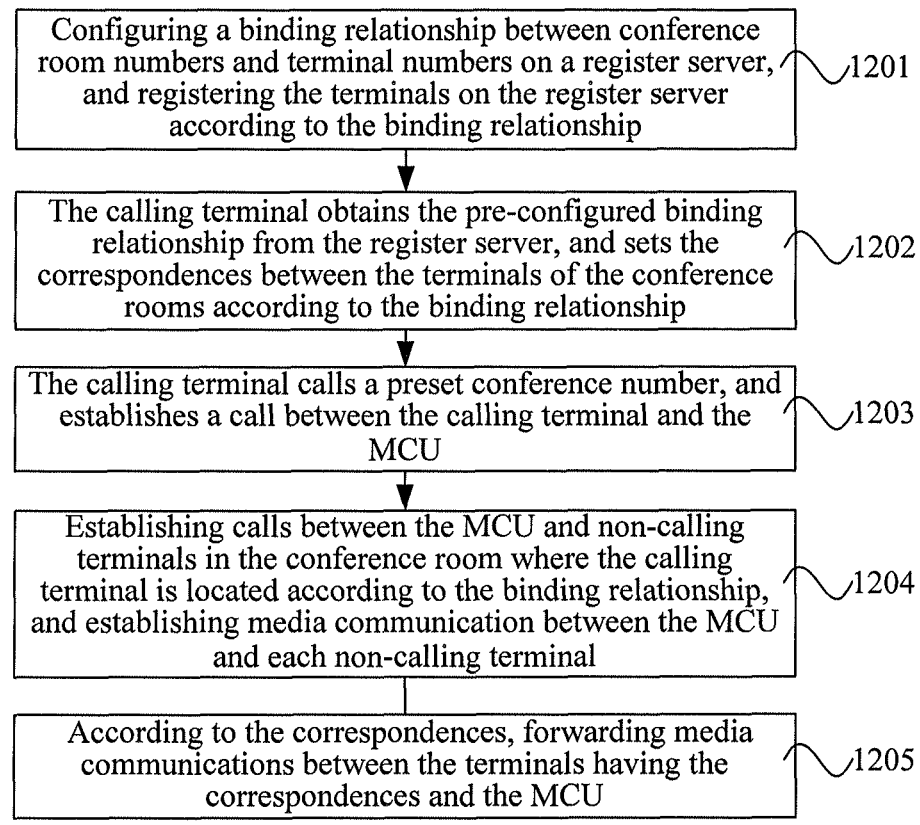
FIG. 12 is a flow diagram of Embodiment 9 of a method for call establishment in the present invention.

FIG. 12 is a flow diagram of Embodiment 9 of a method for call establishment in the present invention. As illustrated in FIG. 12, this embodiment provides a method for call establishment, and it is a concretization of Embodiment 7. In this embodiment, the MCU has a preset conference number, and it may be a calling party or a called party. Herein the MCU serving as a called party is described as an example. Specifically, this embodiment may include:

Step 1201: configuring a binding relationship between conference room numbers and terminal numbers on a register server, and registering the terminals on the register server according to the binding relationship. This step may be similar to step 201, and herein is omitted Step 1202: the calling terminal obtains the pre-configured binding relationship from the register server, sets the correspondences between the terminals of the conference rooms according to the binding relationship, and forwards the correspondences to the MCU.

After receiving the call request signaling sent by the calling terminal, the register server returns to the calling terminal a call response signaling that carries the binding relationship between the conference room number and terminal number corresponding to the calling terminal. Meanwhile, the calling terminal forwards the binding relationship to the MCU, so that the MCU serving as the called party can obtain the binding relationship between the terminals acting as the calling party.

Step 1203: the calling terminal calls the preset conference number, and establishes a call between the calling terminal and the MCU.

The MCU in this embodiment is pre-defined with the conference number of an Adhoc conference, so that the Adhoc conference is supported by this embodiment. By calling the preset conference number through the calling terminal, this step sends to the register server a call request signaling that carries the conference number, so as to establish a call between the calling terminal and the MCU, wherein the calling terminal is a terminal of a certain conference room.

Step 1204: establishing calls between the MCU and non-calling terminals in the conference room where the calling terminal is located according to the binding relationship and establishing media communication between the MCU and each non-calling terminal.

Step 1205: according to the correspondences, forwarding the media communications between the terminals having the correspondences and the MCU.

After the calling terminal and the MCU receive the binding relationship sent by the register server, the calls between other terminals in the conference room where the calling terminal is located and the MCU are established according to the binding relationship, namely, the call between each terminal in the conference room and the MCU can be established. After the call between the terminal and the MCU is established, a media channel is established in the call link of each call, and a code stream is transmitted between each terminal and the MCU through the media channel, thereby implementing the media communication.

A person skilled in the art shall be appreciated that all or a part of steps for implementing the above method embodiments may be completed by instructing relevant hardware through a program that may be stored in a computer readable storage medium, and when being executed, the program performs the steps including the above method embodiments. The storage medium may include various mediums capable of storing program codes, such as ROM, RAM, magnetic disk or optical disk.

Figure 13:
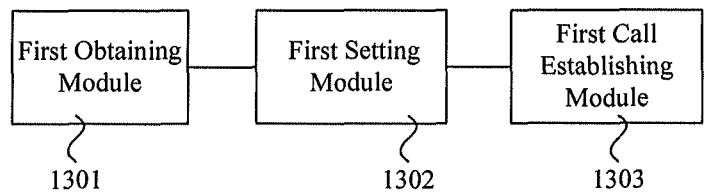
FIG. 13 is a structure diagram of Embodiment 1 of a device for call establishment in the present invention.

FIG. 13 is a structure diagram of Embodiment 1 of a device for call establishment in the present invention. This embodiment provides a device for call establishment that can specifically perform respective steps of Embodiment 1 of the aforementioned method, and herein is omitted. The device for call establishment provided in this embodiment may include a first obtaining module 1301, a first setting module 1302 and a first call establishing module 1303. In which, the first obtaining module 1301 is configured to obtain the pre-configured binding relationship between conference room numbers and terminal numbers. The first setting module 1302 is configured to set correspondences between the terminals of calling and called conference rooms according to the binding relationship. The first call establishing module 1303 is configured to establish media communication with a corresponding terminal.

Figure 14:
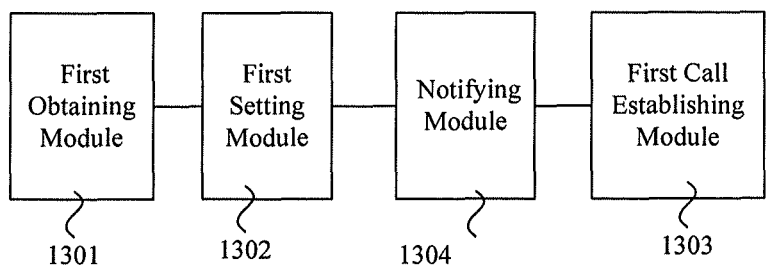
FIG. 14 is a structure diagram of Embodiment 2 of a device for call establishment in the present invention.

FIG. 14 is a structure diagram of Embodiment 2 of a device for call establishment in the present invention. This embodiment provides a device for call establishment that can specifically perform respective steps of Embodiment 2 of the aforementioned method, and herein is omitted. The device for call establishment provided in this embodiment is based on the device as illustrated in FIG. 13. In which, the first obtaining module 1301 is specifically configured to obtain the pre-configured binding relationship between the conference room numbers and the terminal numbers through a register server. The device for call establishment provided in this embodiment may further include a notifying module 1304 configured to send a notification that carries the correspondences to the non-calling terminals of the calling conference room according to the binding relationship, or send a notification that carries the correspondences to the non-calling terminals of the calling conference room via the register server according to the binding relationship.

Figure 15:
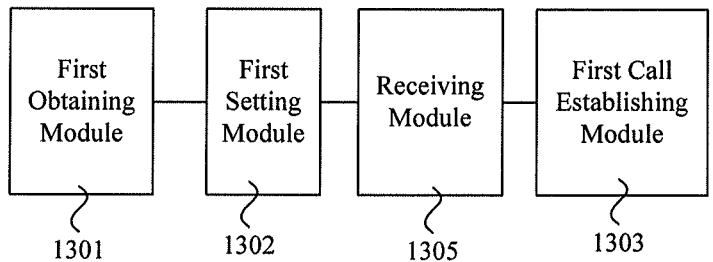
FIG. 15 is a structure diagram of Embodiment 3 of a device for call establishment in the present invention.

FIG. 15 is a structure diagram of Embodiment 3 of a device for call establishment in the present invention. This embodiment provides a device for call establishment that can specifically perform respective steps of Embodiment 3 of the aforementioned method, and herein is omitted. The device for call establishment provided in this embodiment is based on the device as illustrated in FIG. 13. In which, the first obtaining module 1301 is specifically configured to obtain the pre-configured binding relationship between the conference room numbers and the terminal numbers through a register server. The device for call establishment may further include a receiving module 1305 configured to receive the notification that carries the correspondences between the terminals, from the calling terminal or the server. The first call establishing module 1303 is specifically configured to establish a call with its corresponding terminal according to the correspondences carried in the notification received by the receiving module 1305, and establish media communication.

The device provided by the embodiment of the present invention can serve as either a calling terminal or a called terminal.

Figure 16:
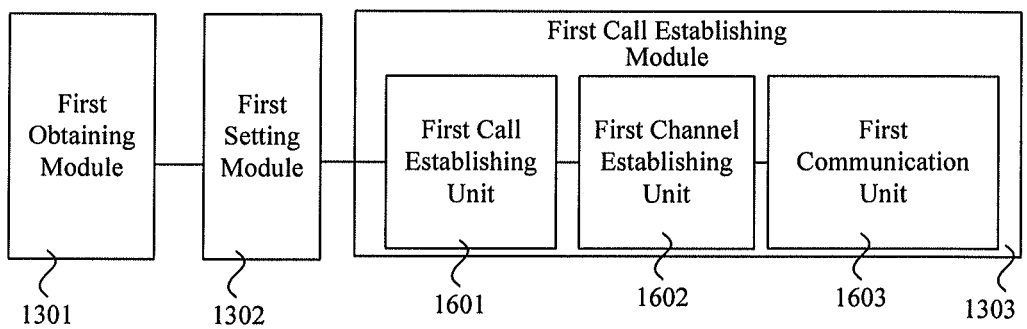
FIG. 16 is a structure diagram of Embodiment 4 of a device for call establishment in the present invention.

FIG. 16 is a structure diagram of Embodiment 4 of a device for call establishment in the present invention. This embodiment provides a device for call establishment that can specifically perform respective steps of Embodiment 4 of the aforementioned method, and herein is omitted. The device for call establishment provided in this embodiment is based on the device as illustrated in FIG. 13. In which, the first obtaining module 1301 is specifically configured to obtain the pre-configured binding relationship between the conference room numbers and the terminal numbers through a register server. The first call establishing module 1303 may include a first call establishing unit 1601, a first channel establishing unit 1602 and a first communication unit 1603. In which, the first call establishing unit 1601 is configured to establish a call with corresponding called terminal according to the correspondences. The first channel establishing unit 1602 is configured to set logic sending channels and media sending channels between the terminals having the correspondences in the calling conference room and the terminals having the correspondences in the called conference room in the call link of the established call, according to the correspondences or the request from the calling terminal. The first communication unit 1603 is configured to transmit media streams between the calling terminal and the called terminal and media streams between the non-calling terminals and the non-called terminals having the correspondences, through the logic sending channels and the media sending channels.

Figure 17:
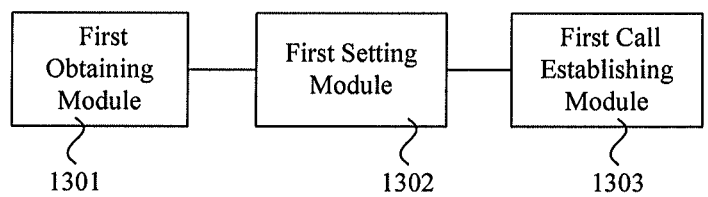
FIG. 17 is a structure diagram of Embodiment 5 of a device for call establishment in the present invention.

FIG. 17 is a structure diagram of Embodiment 5 of a device for call establishment in the present invention. This embodiment provides a device for call establishment that can specifically perform respective steps of Embodiment 5 of the aforementioned method, and herein is omitted. The device for call establishment provided in this embodiment is based on the device as illustrated in FIG. 13. In which, the first obtaining module 1301 is specifically configured to obtain the pre-configured binding relationship between the position numbers and IP addresses of the terminals in the conference room. The first setting module 1302 is specifically configured to set the correspondences between the IP addresses of the terminals of calling and called conference rooms according to the position numbers in the binding relationship.

Figure 18:
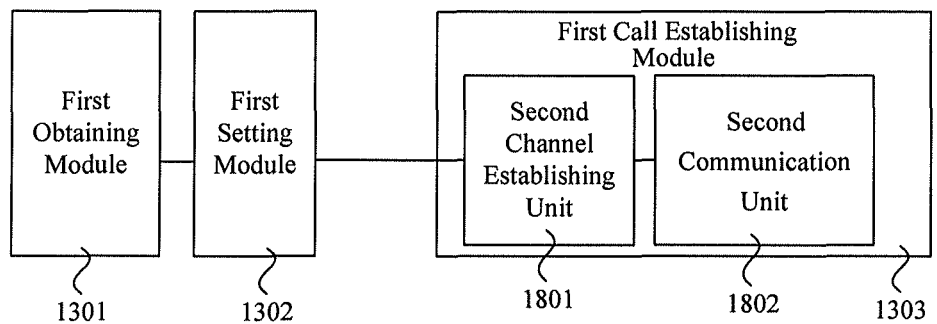
FIG. 18 is a structure diagram of Embodiment 6 of a device for call establishment in the present invention.

FIG. 18 is a structure diagram of Embodiment 6 of a device for call establishment in the present invention. This embodiment provides a device for call establishment that can specifically perform respective steps of Embodiment 9 of the aforementioned method, and herein is omitted. The device for call establishment provided in this embodiment is based on the device as illustrated in FIG. 17. In which, the first obtaining module 1301 is specifically configured to obtain the pre-configured binding relationship between the position numbers and IP addresses of the terminals in the conference room. The first setting module 1302 is specifically configured to set the correspondences between the IP addresses of the terminals of calling and called conference rooms according to the position numbers in the binding relationship. The first call establishing module 1303 includes a second channel establishing unit 1801 and a second communication unit 1802. In which, the second channel establishing unit 1801 is configured to establish a call link between the calling terminal and its corresponding called terminal according to the binding relationship, and set logic sending channels and media sending channels between the terminals having the correspondences in the call link. The second communication unit 1802 is configured to transmit media streams between the calling terminal and the called terminal and media streams between the terminals having the correspondences, through the logic sending channels and the media sending channels.

Figure 19:
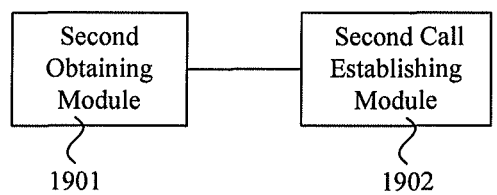
FIG. 19 is a structure diagram of Embodiment 7 of a device for call establishment in the present invention.

FIG. 19 is a structure diagram of Embodiment 7 of a device for call establishment in the present invention. This embodiment provides another device for call establishment, which is configured in an MCU and can specifically perform respective steps of Embodiment 7 of the aforementioned method, and herein is omitted. The device for call establishment provided in this embodiment may include a second obtaining module 1901 and a second call establishing module 1902. In which, the second obtaining module 1901 is configured to obtain the pre-configured binding relationship between the conference rooms and the terminals, and set correspondences between the terminals of the conference rooms according to the binding relationship. The second call establishing module 1902 is configured to establish media communications between the MCU and the terminals according to the binding relationship and the correspondences.

Figure 20:
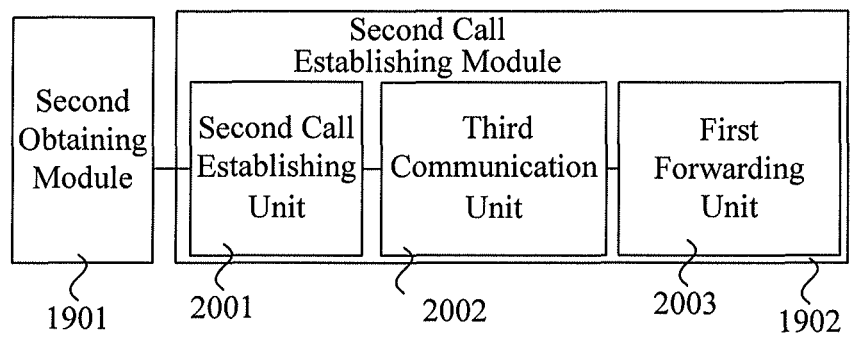
FIG. 20 is a structure diagram of Embodiment 8 of a device for call establishment in the present invention.

FIG. 20 is a structure diagram of Embodiment 8 of a device for call establishment in the present invention. This embodiment provides a device for call establishment that can specifically perform respective steps of Embodiment 8 of the aforementioned method, and herein is omitted. The device for call establishment provided in this embodiment is based on the device as illustrated in FIG. 19. In which, the second call establishing module 1902 includes a second call establishing unit 2001, a third communication unit 2002 and a first forwarding unit 2003. In which, the second call establishing unit 2001 is configured to establish calls between the MCU and called terminals of respective conference rooms. The third communication unit 2002 is configured to establish calls between the MCU and non-called terminals of respective conference rooms according to the binding relationship, and establish media communications between the MCU and respective terminals. The first forwarding unit 2003 is configured to forward media communications between the terminals having the correspondences and the MCU according to the correspondences.

Figure 21:
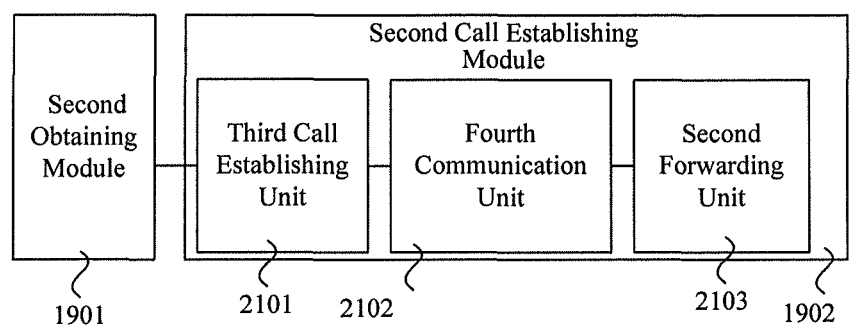
FIG. 21 is a structure diagram of Embodiment 9 of a device for call establishment in the present invention.

FIG. 21 is a structure diagram of Embodiment 9 of a device for call establishment in the present invention. This embodiment provides a device for call establishment that can specifically perform respective steps of Embodiment 9 of the aforementioned method, and herein is omitted. The device for call establishment provided in this embodiment is based on the device as illustrated in FIG. 19. In which, the second obtaining module 1901 is specifically configured to receive the pre-configured binding relationship between the conference rooms and the terminals from a calling terminal that obtains the binding relationship from a register server. The second call establishing module 1902 includes a third call establishing unit 2101, a fourth communication unit 2102 and a second forwarding unit 2103. In which, the third call establishing unit 2101 is configured to establish a call with the calling terminal according to a call from the calling terminal to a preset conference number. The fourth communication unit 2102 is configured to establish calls with non-calling terminals in the conference room where the calling terminal is located, according to the binding relationship, and establish media communications between the MCU and respective terminals. The second forwarding unit 2103 is configured to forward the media communications between the terminals having the correspondences and the MCU according to the correspondences.

This embodiment further provides a system for call establishment, which may include any device for call establishment as illustrated in FIGS. 13-18 and a register server.

This embodiment further provides another system for call establishment, which may include any device for call establishment as illustrated in FIGS. 19-21 and a register server.

A person skilled in the art shall be appreciated that all or a part of steps in various methods of the above embodiments may be completed by instructing relevant hardware through a program that may be stored in a computer readable storage medium. The storage medium may include various mediums capable of storing program codes, such as ROM, RAM, magnetic disk or optical disk.

The above specific embodiments further detailedly describe the objects, technical solutions and beneficial effects of the present invention. It shall be appreciated that the above descriptions are just specific embodiments of the present invention, rather than limitations to the protection scope of the present invention. Any modification, equivalent substitution and improvement made within the sprit and principle of the present invention shall be covered by the protection scope of the present invention.

What is claimed is:

1. A method for call establishment, comprising:
obtaining a pre-configured binding relationship between a plurality of conference rooms and terminals through a register server;
setting correspondences between terminals of calling and called conference rooms according to the binding relationship;
establishing media communications with the terminals having the correspondences, and
sending a notification that carries the correspondences to non-calling terminals of the calling conference room, according to the binding relationship;
wherein establishing media communications with the terminals having the correspondences comprises: establishing a call between each terminal of the calling conference room and a corresponding terminal of the called conference room according to the correspondences, and performing media communication between each terminal and the corresponding terminal.

2. The method according to claim 1, wherein obtaining the pre-configured binding relationship between the plurality of conference rooms and the terminals further comprises: obtaining the pre-configured binding relationship between position numbers and IP addresses of the terminals of the conference room; and
setting the correspondences between the terminals of the calling and called conference rooms according to the binding relationship comprises: setting the correspondences between the IP addresses of the terminals of the calling and called conference rooms according to the position numbers in the binding relationship.

3. The method according to claim 1, wherein establishing media communications with the terminals having the correspondences comprises: in case the calling terminal requests to call a terminal of other conference room having no correspondence therewith, one of resolving an IP address of a terminal of the conference room having correspondence with the calling terminal, and returning it to the calling terminal; or returning a call response signaling to the calling terminal to establish a call with the calling terminal, and initiating a call to the terminal of the conference room having correspondence with the calling terminal; or refusing the call from the calling terminal, and returning a number of the terminal of the conference room having correspondence therewith, so that the calling terminal reinitiates a call according to the number; or returning the correspondences between all the terminals of the two conference rooms to the calling terminal, which hangs up the current call, selects a terminal number of the terminal having correspondence therewith and reinitiates a call; or during the call process, establishing a call according to the number requested to be called by the calling terminal, and opening logic channel between terminals of the conference rooms having the correspondences; or returning the correspondences between all the terminals of the two conference rooms to the calling terminal, which hangs up the current call, selects a terminal number having correspondence therewith and reinitiates a call, and sends a notification that carries the correspondences to non-calling terminals of the calling conference room through the register server, according to the binding relationship.

4. The method according to claim 1, wherein setting the correspondences between the terminals of the calling and called conference rooms according to the binding relationship comprises: obtaining the correspondences between the terminals of the calling and called conference rooms from the register server configured with the binding relationship between the conference rooms and the terminals.

5. A method for call establishment, comprising:
obtaining a pre-configured binding relationship between a plurality of conference rooms and terminals, and setting correspondences between terminals of the conference rooms according to the binding relationship; and establishing media communications between a Multiple Control Unit (MCU) and the terminals according to the binding relationship and the correspondences, wherein establishing media communications between the MCU and the terminals according to the binding relationship and the correspondences comprises:

establishing calls between the MCU and called terminals of respective conference rooms;

establishing calls between the MCU and non-called terminals of respective conference rooms according to the binding relationship, and establishing media communications between the MCU and respective terminals;

according to the correspondences, forwarding the media communications between the terminals having the correspondences and the MCU.

6. The method according to claim 5, wherein obtaining the pre-configured binding relationship between the conference rooms and the terminals comprises: receiving the pre-configured binding relationship between the conference rooms and the terminals from the calling terminal which obtains the binding relationship from a register server;

establishing media communications between the MCU and the terminals according to the binding relationship and the correspondences comprises:

establishing a call with the calling terminal according to a call from the calling terminal to a preset conference number;

establishing calls with non-calling terminals in the conference room where the calling terminal is located according to the binding relationship, and establishing media communications between the MCU and respective terminals; and forwarding the media communications between the terminals having the correspondences and the MCU according to the correspondences.

7. A device for call establishment, comprising:
a first obtaining module configured to obtain a pre-configured binding relationship between a plurality of conference rooms and terminals through a register server;

a first setting module configured to set correspondences between the terminals of calling and called conference rooms according to the binding relationship;

a first call establishing module configured to establish media communication with a corresponding terminal, a notifying module configured to send a notification carrying the correspondences to non-calling terminals of the calling conference room according to the binding relationship, or send a notification carrying the correspondences to the non-calling terminals of the calling conference room via the register server according to the binding relationship; and a receiving module configured to receive from the calling terminal or the register server, the notification carrying the correspondences between the terminals;

wherein the first call establishing module is configured to establish a call between each terminal of the calling conference room and a corresponding terminal of the called conference room according to the correspondences carried in the notification received by the receiving module, and establish media communication between each terminal and the corresponding terminal.

8. The device for call establishment according to claim 7, wherein the first obtaining module is configured to obtain a pre-configured binding relationship between position numbers and IP addresses of the terminals in the conference room; and the first setting module is configured to set the correspondences between the IP addresses of the terminals of the calling and called conference rooms according to the position numbers in the binding relationship.

9. A method for call establishment, comprising:
obtaining a pre-configured binding relationship between a plurality of conference rooms and terminals through a register server;

setting correspondences between terminals of calling and called conference rooms according to the binding relationship; and establishing media communications with the terminals having the correspondences, wherein establishing media communications with the terminals having the correspondences comprises:

establishing a call with a corresponding called terminal according to the correspondences;

according to the correspondences, setting logic sending channels and media sending channels between non-calling terminals of the calling conference room and non-called terminals of the called conference room which have the correspondences in a call link of the established call; and transmitting the media streams between the calling terminal and the called terminal and those between the non-calling terminals and the non-called terminals having the correspondences, through the logic sending channels and the media sending channels.

10. A method for call establishment, comprising:
obtaining a pre-configured binding relationship between a plurality of conference rooms and terminals;
setting correspondences between terminals of calling and called conference rooms according to the binding relationship; and
establishing media communications with the terminals having the correspondences,
wherein setting the correspondences between the terminals of the calling and called conference rooms according to the binding relationship comprises: obtaining the correspondences between the terminals of the calling and called conference rooms from the register server configured with the binding relationship between the conference rooms and the terminals,
wherein establishing media communications with the terminals having the correspondences comprises:
establishing a call link between the calling terminal and corresponding called terminal according to the binding relationship, and setting logic sending channels and media sending channels between the terminals having the correspondences in the call link; and
transmitting the media streams between the terminals having the correspondences through the logic sending channels and the media sending channels.

11. A device for call establishment, comprising:
a first obtaining module configured to obtain a pre-configured binding relationship between a plurality of conference rooms and terminals through a register server;
a first setting module configured to set correspondences between the terminals of calling and called conference rooms according to the binding relationship; and
a first call establishing module configured to establish media communication with a corresponding terminal,
wherein the first call establishing module comprises:
a first call establishing unit configured to establish a call with a corresponding called terminal according to the correspondences or a request from the calling terminal;
a first channel establishing unit configured to set logic sending channels and media sending channels between the terminals having the correspondences in the calling conference room and the terminals having the correspondences in the called conference room in a call link of the established call, according to the correspondences; and
a first communication unit configured to transmit media streams between the terminals having the correspondences, through the logic sending channels and the media sending channels.

12. A device for call establishment, comprising:
a first obtaining module configured to obtain a pre-configured binding relationship between a plurality of conference rooms and terminals;
a first setting module configured to set correspondences between the terminals of calling and called conference rooms according to the binding relationship; and
a first call establishing module configured to establish media communication with a corresponding terminal,
wherein the first obtaining module is configured to obtain a pre-configured binding relationship between position numbers and IP addresses of the terminals in the conference room; and the first setting module is configured to set the correspondences between the IP addresses of the terminals of the calling and called conference rooms according to the position numbers in the binding relationship,
wherein the first call establishing module comprises:
a second channel establishing unit configured to establish a call link between the calling terminal and a corresponding called terminal according to the binding relationship, and set logic sending channels and media sending channels between the terminals having the correspondences in the call link; and
a second communication unit configured to transmit media streams between the terminals having the correspondences through the logic sending channels and the media sending channels.

* * * * *